(12) United States Patent
Højlund-Nielsen et al.

(10) Patent No.: US 11,867,601 B2
(45) Date of Patent: Jan. 9, 2024

(54) METHOD OF OPTICAL CHARACTERISATION OF LIQUIDS

(71) Applicant: Copenhagen Nanosystems ApS, Kgs. Lyngby (DK)

(72) Inventors: Emil Højlund-Nielsen, København Ø (DK); Christopher James Lüscher, Valby (DK); Thomas Tølbøl Sørensen, Kongens Lyngby (DK)

(73) Assignee: Copenhagen Nanosystems ApS, Kgs. Lyngby (DK)

( * ) Notice: Subject to any disclaimer, the term of this patent is extended or adjusted under 35 U.S.C. 154(b) by 238 days.

(21) Appl. No.: 17/286,608

(22) PCT Filed: Oct. 25, 2019

(86) PCT No.: PCT/EP2019/079256
§ 371 (c)(1),
(2) Date: Apr. 19, 2021

(87) PCT Pub. No.: WO2020/084141
PCT Pub. Date: Apr. 30, 2020

(65) Prior Publication Data
US 2021/0372909 A1  Dec. 2, 2021

(30) Foreign Application Priority Data
Oct. 26, 2018 (DK) .................... PA 2018 70699

(51) Int. Cl.
*G01N 15/02* (2006.01)
*G01N 15/14* (2006.01)
(52) U.S. Cl.
CPC ......... *G01N 15/0211* (2013.01); *G01N 15/14* (2013.01); *G01N 2015/1493* (2013.01)

(58) Field of Classification Search
CPC .............. G01N 15/0211; G01N 15/14; G01N 2015/1493
See application file for complete search history.

(56) References Cited

U.S. PATENT DOCUMENTS 4,436,420 A * 3/1984 Depp ................. G01N 21/4133
356/128
2003/0049693 A1  3/2003 Goh
(Continued)

FOREIGN PATENT DOCUMENTS

WO  WO2017129196  8/2017

OTHER PUBLICATIONS

Sultanova, N. et al, "Dispersion properties of optical polymers", ACTA Physica Polonica A, vol. 116(4), pp. 585-587, (2009).
(Continued)

*Primary Examiner* — Rebecca C Bryant
(74) *Attorney, Agent, or Firm* — McHale & Slavin, P.A.

(57) ABSTRACT

A method of liquid characterisation using an optical characterisation system. The optical characterisation system comprises an optical element comprising a light source and light detector, and defining a light path extending between the light source and light detector. The detector resolves light intensities at varying wavelengths. The system also comprises a liquid container and a photonic crystal attached to the first container surface and facing the interior. The method comprises: recording a first transmission spectrum, wherein at least part of the first and second container surfaces, the interior containing liquid and the photonic crystal intercept the light path, and the interior intercepts the light path before the photonic crystal, and recording a second transmission spectrum. At least part of the first and second container surfaces, the interior containing liquid and
(Continued)

the photonic crystal intercept the light path. The photonic crystal intercepts the light path before the interior.

10 Claims, 22 Drawing Sheets

(56) References Cited

U.S. PATENT DOCUMENTS

| | | |
|---|---|---|
| 2006/0057707 A1* | 3/2006 | Cunningham ....... G02B 5/1852 |
| | | 435/287.1 |
| 2008/0180672 A1 | 7/2008 | Sigalas |
| 2011/0237464 A1 | 9/2011 | Cunningham et al. |
| 2012/0258549 A1* | 10/2012 | Lu ...................... G01N 21/6458 |
| | | 422/69 |
| 2013/0093936 A1 | 4/2013 | Scheeline et al. |

OTHER PUBLICATIONS

Daimon, M. et al, "Measurement of the refractive index of distilled water from the near-infrared region to the ultraviolet region", Applied Optics, vol. 46(18), pp. 3811-3820, (2007).

* cited by examiner

METHOD OF OPTICAL CHARACTERISATION OF LIQUIDS

CROSS REFERENCE TO RELATED APPLICATIONS

This is a national stage filing in accordance with 35 U.S.C. § 371 of PCT/EP2019/079256, filed Oct. 25, 2019, which claims the benefit of the priority of Denmark Patent Application No. PA 2018 70699, filed Oct. 26, 2018, the contents of each are incorporated herein by reference.

TECHNICAL FIELD

The present invention relates to a method of optical characterisation of liquids. The liquids may contain suspended particles for characterisation.

BACKGROUND OF THE INVENTION

In characterising, e.g., the purity of drinking water, measuring the turbidity often forms a key part of the analysis. The turbidity measured in units of FTU is generally obtained by measuring the incident light scattered at right angles. However, such measurements generally do not provide an exact measure of the turbidity of the particle containing liquid. This is particularly often the case in the case of nano-og micro meter size particles.

It is often desirable to characterise a liquid in terms of the particles suspended in the liquid. This is relevant for, e.g., determining the quality of drinking water, the protein content of milk, the properties of paint etc. While many characterisation methods exist, a dominant method for obtaining a size distribution for particles suspended in liquid is dynamic light scattering (DLS). DLS offers one of the currently most accurate method for obtaining a size distribution of relatively small particles and polymers suspended in liquid. However, DLS apparatuses are relatively expensive and complicated limiting its mainstream applicability. Further, DLS analysis methods often require a user to input the refractive index of the fluid sample to be analysed. Often this is not exactly known and requires estimation of the refractive index. Such estimation may lead to errors in the obtained size distribution. DLS apparatuses also often yield relatively imprecise estimates in cases where the fluid sample contains particles of varying size with a relatively broad size distribution.

Another method of characterising a liquid in terms of the particles suspended in the liquid is Particle size spectrophotometry. Such method relies on analysis of absorption spectra recorded in spectrophotometer. In this case, the observed absorption spectra may be correlated with a size distribution for the particles suspended in the liquid. However, according to a producer of such an instrument significant inaccuracy is expected for relatively small particles of nano meter size. This is because, at the small-particle end, particles undergo Rayleigh scattering. The spectral shape is not dependent on particle size and the spectra all look self-similar. As a result, the particle size spectrum cannot independently determine both the particle size and particle concentration. At the large particle end, again the spectra all look fairly flat and self-similar, and no size may be determined. Essentially, the particle casts a shadow on the detector over all wavelengths.

So while various optical characterisation methods exist, a need for optimisation persists.

SUMMARY OF THE INVENTION

In a first aspect, embodiments of the invention provide a method of liquid characterisation using an optical characterisation system, the optical characterisation system comprising:
an optical element comprising a light source and light detector, and defining a light path extending between the light source and light detector, the detector being able to resolve light intensities at varying wavelengths;
a liquid container comprising first and second container surfaces defining at least part of an interior of the liquid container, at least part of the first and second container surfaces being transparent and parallel; and
a photonic crystal being attached to or being integrally formed with the first container surface and facing the interior, the photonic crystal comprising a first grating part having a first modulation period defined in a first plane,
wherein the method comprises the steps of:
recording a first transmission spectrum, wherein at least part of the first and second container surfaces, the interior containing liquid and the photonic crystal intercept the light path, and the interior intercepts the light path before the photonic crystal; and
recording a second transmission spectrum, wherein at least part of the first and second container surfaces, the interior containing liquid and the photonic crystal intercept the light path, and the photonic crystal intercepts the light path before the interior.

Thanks to the provision of recording the first and second transmission spectra as prescribed in claim 1, hitherto unprecedented information richness is derivable from the optical characterisation method which may be performed with relatively little practical effort.

The photonic crystal with the first modulation period gives rise to a first resonant wavelength band. The first resonant wavelength band describes how the photonic crystal reflects light in a wavelength dependent manner. In general, the photonic crystal reflects light when the energy of the incident light corresponds to the energy of a resonant mode of the photonic crystal. Such reflection can be observed in a transmission spectrum of light having passed through the photonic crystal. In this case, a resonance feature is observable where the wavelength of the incident light in the light path corresponds to a characteristic wavelength of the photonic crystal. In case the transmission spectrum is plotted as such a spectrum, i.e. when plotting the light reaching the sensor as a function of wavelength, such a feature will appear as a resonance valley. Whereas if the data is plotted as an absorption or attenuance spectrum, such a resonance feature corresponding to light having been reflected at the given wavelength will appear in the form of a resonance peak. Accordingly, resonance modes may equally be studied in transmission spectra directly or in absorption or attenuance spectra.

The energy of each resonant mode depends on the geometry and material properties of the photonic crystal. Hence, the photonic crystal can be tailored to exhibit resonant modes at energies desirable for optical characterisation systems such as, e.g., in the visible and UV spectra, which makes them suitable for use with, e.g., liquid containers made from glass. The energy of at least some of the resonant modes further depends on the incident angle of the incident light. These resonant modes will hereafter be referred to as resonant angle modes. Moreover, for these resonant angle modes the angle at which the light hits the photonic crystal will affect at what wavelength it reflects the light. By analysing the resonance peaks associated with these resonant angle modes, information concerning the incident angle of the incident light may be derived. Accordingly, such analysis allows for deriving a refractive index for something the light has passed through before it hits the photonic crystal.

When recording the first transmission spectrum, the light has passed through the second container surface and the interior of the liquid container before hitting the photonic crystal. Accordingly, the light may have been scattered by both of the second container surface and any liquid and particles in the interior before reaching the photonic crystal. This collective scattering is derivable from analysis of the resonance peaks in the first transmission spectrum associated with the resonant angle modes.

When recording the second transmission spectrum, the light has not passed through the interior and the second container surface before hitting the photonic crystal. Accordingly, analysis of the resonance peaks associated with the resonant angle modes in the second transmission allows for deriving a measure for scattering without a contribution from the liquid and particles in the interior.

Particularly in embodiments where the first and second container surfaces are parallel and only differ with respect to the presence or absence of the photonic crystal, this allows for isolating the effect of the liquid and particles in the interior of the container on the incident angle of the light on the photonic crystal.

As a result, embodiments of the present invention allows for deriving a measure of scattering caused by liquid and particles in the interior of the liquid container by collecting and analysing the first and second transmission spectra.

Generally, when a plane wave encounters a perfect sphere, a particle, or a biological cell, then some of the light will be absorbed and some will be scattered. These processes can be calculated by scattering theory for various particle sizes. The Mie solution to Maxwell's equations (also known as the Lorenz-Mie solution, the Lorenz-Mie-Debye solution or Mie scattering) describes the scattering of an electromagnetic plane wave by a homogeneous sphere. The solution takes the form of an infinite series of spherical multiple partial waves. It can be used to calculate light scattering by non-absorbing, partially-absorbing, or perfectly conducting spheres.

In terms of definitions, the extinction efficiency (scattering or absorption) is the ratio of an extinction (scattering or absorption) cross-section to a particle's geometric cross-sectional area. The extinction efficiency with respect to a particle is defined as the sum of the scattering efficiency and the absorbance efficiency, while the scattering anisotropy is a measure of the amount of forward direction retained after a single scattering event and is defined with respect to the average cosine of the scattering phase function. The attenuation measured by a spectrophotometer can be calculated by multiplying the extinction efficiency with the length of the light path, the concentration and a mathematical constant of base 10 logarithm to Euler's number.

The liquid container may be a cuvette defining two sets of opposing cuvette walls, one of the sets of opposing walls comprising the first and second container surfaces. The cuvette may define a square footprint wherein the ends of the two sets of opposing walls in conjunction with the edges of a bottom wall define the perimeter of the square footprint. Such cuvettes may be particularly suitable for use with a, e.g., commercially available spectrophotometer.

The liquid container may also form part of, or comprise, a flow path wherein the liquid to be characterised flows in a flow path intercepting the light path. The flow of the liquid may be controlled to be zero during recording of the first and second transmission spectra. This allows for characterising a change in particle composition in the liquid. Such change may occur if due to, e.g., a chemical reaction of particles in the liquid, a decay of particles in the liquid or a flow of particles relative to the liquid. These processes may be analysed by adding steps of recording consecutive sets of first and second transmission spectra at consecutive points in time and consecutive amounts of 'flow propagation'. Herein flow propagation refers to flow of liquid propagating past the first and second surfaces intercepting the light path.

The light source may be any kind of broad spectrum light source, such as, e.g., a gas lamp, preferably with a relatively flat spectrum in the visible spectrum, possibly also in the UV spectrum. In this case, the light sensor is preferably able to measure both the intensity and wavelength of incident light. The light source may also be a kind of light source having a relative narrow but variable light spectrum. In preferred embodiments, the light sensor is able to sense light having passed through any part of the photonic crystal for light having an incident angle of 85-95 degrees relative to the first plane, preferably 80-100 degrees. Accordingly, the light sensor preferably has a larger extent than the photonic crystal in a plane perpendicular to the centre of the light path. The light path may also be focused by optical lenses before reaching the light sensor, in which case it may have a significantly smaller extent in said plane. The light sensor is accordingly preferably a light sensor having extending in two directions in said plane.

Preferably, the first photonic crystal comprises first and second overlapping layers, the first layer having the first modulation period and a first refractive index, and the second layer having the first modulation period and a second refractive index, and wherein the first refractive index is larger than the second refractive index. Preferably, the first layer faces the interior and the second layer faces the first container surface.

In some embodiments of the invention, the method comprises a step of deriving a quantitative measure of scattering from any particles in the liquid by analysing the first and second transmission spectra.

The first and second transmission spectra comprise resonance features with characteristics that change depending on the angle distribution of light incident on the photonic crystal. As described in relation to claim 1 above, the second transmission spectrum is recorded with the photonic crystal intercepting the light path before the interior and the liquid. Accordingly, the angle distribution of light incident on the photonic crystal does not depend on any scattering caused by particles in the liquid. Thereby a kind of intrinsic characteristics of the resonance features for the given light source, first and second container surfaces, photonic crystal and liquid in the interior is derivable from the second transmission spectrum.

In contrast, the first spectrum is recorded with light having passed through the liquid in the interior before reaching the photonic crystal. Accordingly, if the light has been scattered by, e.g., particles in the liquid before reaching the photonic crystal, the incident light angle distribution is different from that in recording the first transmission spectrum. Accordingly, by comparative analysis of the characteristics of the resonance features in the first and second transmission spectra respectively, the contribution from scattering by particles in the liquid can be isolated. This isolated scattering contribution from the particles is a valuable characteristic in many applications, such as, e.g., that of obtaining a measure of the turbidity of, e.g., drinking water.

In some embodiments of the invention, the method comprises a step of deriving the average size of particles in the liquid comprising comparatively analysing of the first and second transmission spectra.

The average size of particles in the liquid is particularly difficult to obtain with known optical methods for characterising particles in liquid when the particles have dimensions in the nano meter range or may require substantially more sophisticated optical characterisation systems. Such difficulties are overcome by present embodiments due to the provision of comparative analyses of the first and second spectra. The average size is driveable from comparative analysis of the splitting of a resonance mode in the first and second transmission spectra. At least one resonance mode split up due to the incident light angle distribution on the photonic crystal. By studying the particulars of the split up, it is possible to derive a measure for the average size of particles in the liquid. Specifically, the average size of particles in the liquid may be derived from, e.g., comparing the position of the maxima, or minima, of the split resonance features in the first transmission spectrum arising from the split resonance mode, with the position of the maxima, or minima, of the corresponding split resonance features in the second transmission spectrum. From this comparison the average size of the particles is derivable by use of, e.g., Mie theory or Rayleigh scattering theory, Rayleigh scattering theory being particularly useful for deriving the average size of relative small particles. In relation to this it is useful to note that the input necessary for accurate average size determination of particles using Rayleigh scattering theory is generally not available with known optic methods for characterising particles in liquid and/or require the use of significantly more sophisticated and pricy optical characterisation systems and/or require estimation of parameters such as, e.g., the refractive index of the liquid leading to inaccuracy of the determined size distribution.

In some embodiment of the invention, the method comprises a step of deriving the size distribution of particles in the liquid comprising comparatively analysing the first and second transmission spectra.

The size distribution of particles in the liquid is driveable from comparative analysis of the splitting of a resonance mode in the first and second transmission spectra. At least one resonance mode split up due to the incident light angle distribution on the photonic crystal. By analysing the particulars of the split up in the first and second transmission spectra, it is possible to derive the size distribution of particles in the liquid. Specifically, the size distribution of particles in the liquid may be derived from, e.g., comparing the width or Full Width Half Max (FWHM) of the split resonance features in the first transmission spectrum arising from the split resonance mode, with the width or FWHM of the corresponding split resonance features in the second transmission spectrum. From this comparison the size distribution of the particles in the liquid is derivable by use of, e.g., Mie theory or Rayleigh scattering theory, Rayleigh scattering theory being particularly useful for deriving the size distribution of relatively small particles. In relation to this it is useful to note that the input necessary for accurate size distribution determination of particles using Rayleigh scattering theory is generally not available with known optic methods for characterising particles in liquid and/or require the use of significantly more sophisticated and pricy optical characterisation systems and/or require estimation of parameters such as, e.g., the refractive index of the liquid leading to inaccuracy of the determined size distribution.

In some embodiments of the invention, a second photonic crystal is attached to or integrally formed with the first container surface facing the interior, the second photonic crystal defining a second plane and comprising a second grating part having a second modulation period, and wherein the first and second transmission spectra are recorded with at least part of the second photonic crystal in the light path.

The second photonic crystal with the third modulation period defines a second set of ret of resonance modes, the energy of which may be tuned depending on the dimensions and materials of second photonic crystal. This gives rise to a second resonance wavelength band in the first and second transmission spectra at different wavelengths than the resonance features in the first resonance wavelength band. Accordingly, the second set of resonance features in the first and second transmission spectra allows for comparative analysis of split of a resonance mode found at a different range of wavelengths compared to that arising from the first photonic crystal. This enables analysis of how the light is scattered from the particles at the different range of wavelengths. The wavelength dependent scattering is a direct input to Mie theory and Rayleigh scattering theory and may hence lead to more precise determination of, e.g., the average size and the size distribution of particles in the liquid.

Preferably, the second photonic crystal comprises third and fourth overlapping layers, the third layer having the second modulation period and a third refractive index, and the fourth layer having the second modulation period and a fourth refractive index, and wherein the third refractive index is larger than the fourth refractive index. Preferably, the third layer faces the interior and the fourth layer faces the first container surface.

In some embodiments of the invention, the first photonic crystal abuts the second photonic crystal. This minimises or alleviates the need for changing the light path for interception by the first or second photonic crystal.

In some embodiments of the invention, the first modulation period gives rise to a first resonance wavelength band, and wherein the second modulation period gives rise to a second resonance wavelength band, and wherein the first and second resonance wavelength bands do not overlap. This enhances the possibility of deciphering which of the first and second resonance band a particular resonance feature belongs to.

Preferably, both of the first and the second photonic crystals are in the light path simultaneously during recording of each of the first and second transmission spectra for increasing the data acquisition speed.

In some embodiments of the invention, the optical element further comprises a container receptacle configured to hold the liquid container in at least a first and second orientation, wherein the method comprises the steps of:
  placing the liquid container in the container receptacle in the first orientation, the first orientation orienting the liquid container so as to record the first transmission spectrum; and
  changing the orientation of the liquid container in the sample holder to the second orientation, the second orientation orienting the liquid container so as to record the second transmission spectrum.

This allows the method to be conducted with relatively simple technical means such as, e.g., a standard spectrophotometer with a container receptacle configured to receive a liquid container at four different angles relative to the light path of the spectrophotometer without the need for possibly price-raising automation technology.

Present embodiments may be particularly useful in combination with those conducted with the first and second photonic crystals as such embodiments allows for correction of faults that may arise from imprecise orientation of the liquid orientation relative to the light path.

An imprecise first and/or second orientation will affect the resonance features in the first and second transmission spectra in a wavelength independent manner. So the resonance features of the first resonance wavelength band and the second resonance wavelength band will in such cases be affected similarly. Particles in the liquid may affect the resonance features in the first and second transmission spectra in a wavelength dependent manner. So such particles in the liquid will have a different effect on resonance features of the first and second resonance wavelength bands respectively. Accordingly, quantitative analysis of such differences allows for isolation of contributions to differences between the first and second transmission spectra arising from an imprecise first and/or second orientation.

In some embodiments, wherein the optical element is configured to provide at least a first light path and a second light path, and wherein:
  the first transmission spectrum is recorded with light being provided along the first light path, the interior and photonic crystal intercepting the first light path, and the interior intercepting the first light path before the photonic crystal;
  the second transmission spectrum is recorded with light being provided along the second light path, the interior and photonic crystal intercepting the second light path, and the photonic crystal intercepting the second light path before the interior; and wherein
  the orientation of the liquid container is not altered between recording the first transmission spectrum and recording the second transmission spectrum.

This allows for relatively quick data acquisition without a need for changing the orientation of the liquid container between recording the first transmission spectrum and the second transmission spectrum. The first and second light paths may be brought about having a single light source and a single light detector by appropriate use of semi-transparent mirrors, possibly having light direction dependent transparency.

In some embodiments, the method further comprises the step of:
  recording a third transmission spectrum wherein the photonic crystal is not in the light path.

The third transmission spectrum can thereby constitute a kind of background spectrum which may advantageously be subtracted from the first and second transmission spectra. This allows for isolating features in the first and second transmission spectra arising from interaction with the first and/or second photonic crystal.

In some embodiments of the invention, the liquid container further comprises third and fourth container surfaces defining at least part of the interior, at least part of the third and fourth container surfaces being transparent and parallel, and wherein the third transmission spectrum is recorded with at least part of the third and fourth container surfaces and the interior intercepting the light path. This makes the method particularly simple to implement, as the third transmission spectrum may then be recorded after simply rotating the liquid container relative to the light path.

In some embodiments of the invention, the optical element is configured to provide at least a third light path, wherein the third transmission spectrum is recorded with light being provided along the third light path, the third and fourth container surfaces intercepting the third light path. This allows for a high degree of automation and a possibility of obtaining the third transmission spectrum without a need to change the orientation of the liquid container.

In a second aspect, embodiments provide a method of characterisation of samples comprising biological material by use of the method according to the first aspect.

In some embodiments of the second aspect, the biological material comprises biological cells.

In some embodiments of the second aspect, the biological cells are yeast cells and/or bacterial cells, such as *E. coli*.

In some embodiments of the second aspect, the biological cells are alive during characterisation.

In some embodiments of the second aspect, the method according to the first aspect is used to allow quantitative scattering analysis on live samples of cells.

In some embodiments of the second aspect, the characterisation comprises determining at least a cell concentration.

In some embodiments of the second aspect, the characterisation comprises determining at least an average cell size.

In some embodiments of the second aspect, the characterisation comprises determining at least a cell size distribution.

In some embodiments of the second aspect, the biological material comprises at least a first type of cells and a second type of cells, and wherein the characterisation comprises determining at least one of the concentration of the first type of cells relative to the second type of cells, the average size of the first and/second type of cells, the size distribution of the first and/or second type of cells, the concentration of the first and/or second type of concentration.

BRIEF DESCRIPTION OF THE DRAWINGS

Embodiments of the invention will now be further described with reference to the accompanying drawings, in which.

DETAILED DESCRIPTION OF THE DRAWINGS

Figure 1:
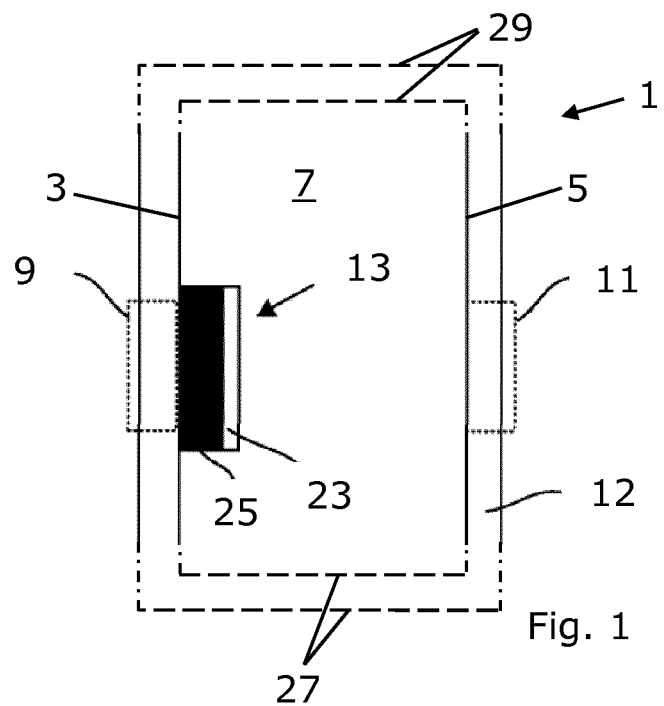
FIGS. 1-3 illustrate a liquid container for use in an embodied method.

FIG. 1 illustrates a liquid container 1 comprising first and second container surfaces 3,5 defining part of an interior 7 of the liquid container 1. The first and second container surfaces 3,5 comprise transparent and parallel parts 9,11 and together form part of a wall 12. The first container surface 3 comprises a photonic crystal 13. The first and second container surfaces 3,5 may be made from, e.g., polymers such as, e.g., Poly(methyl methacrylate) (PMMA), or from other transparent substantially rigid materials such as, e.g., glass. The liquid container 1 is for use in conjunction with an optical element (not shown) comprising a light source and light detector. The light may be a kind of broad spectrum light source, such as, e.g., a gas lamp, preferably with a relatively flat spectrum in the visible spectrum, possibly also in the UV spectrum. In this case, the light sensor is preferably able to measure both the intensity and wavelength of incident light. The light sensor may be able to sense light having passed through any part of the photonic crystal 13 for light having an incident angle of 85-95 degrees relative to the first plane, preferably 80-100 degrees.

Figure 4:
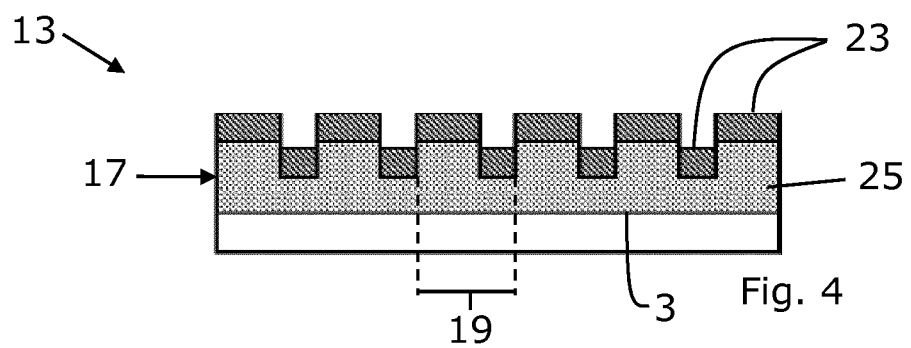
FIGS. 4-5 illustrate a photonic crystal for use in an embodied method.
Figure 5:
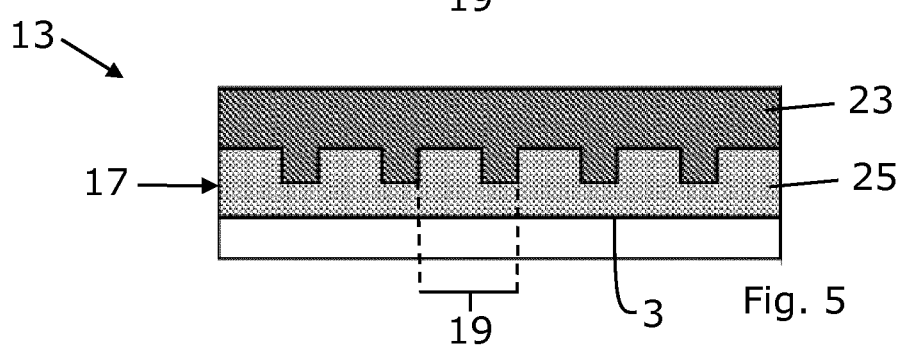

The photonic crystal 13 is attached to the first container surface 3 over the transparent part 9. The photonic crystal 13 could equally well have been integrally formed with the first container surface 3. Details of the photonic crystal are illustrated more clearly in FIGS. 4 and 5 showing its first grating part 17 with a first modulation period defined by the period length 19. The first grating part 17 extends in a first plane and comprises first and second overlapping layers 23,25. The two layers 23,25 both have the first modulation period, while the first layer 23 has first refractive index, and the second layer 25 has a second refractive index. The first refractive index is larger than the second refractive index. The first layer faces the interior 7 and the second layer 25 faces the first container surface 3.

In one embodiment, the liquid container 1 is a cuvette defining two sets of opposing cuvette walls, one of the sets of opposing walls comprising the first and second container surfaces 3,5. The cuvette may define a square footprint wherein the ends of the two sets of opposing walls in conjunction with the edges of a bottom wall illustrated by the dashed line 27 define the perimeter of the square footprint. Such cuvettes may be particularly suitable for use with, e.g., a commercially available spectrophotometer. In this case, the dashed line 29 of each of the illustrations of FIGS. 1-3 represents an opening, which may be sealed off by a plug (not shown).

Figure 2:
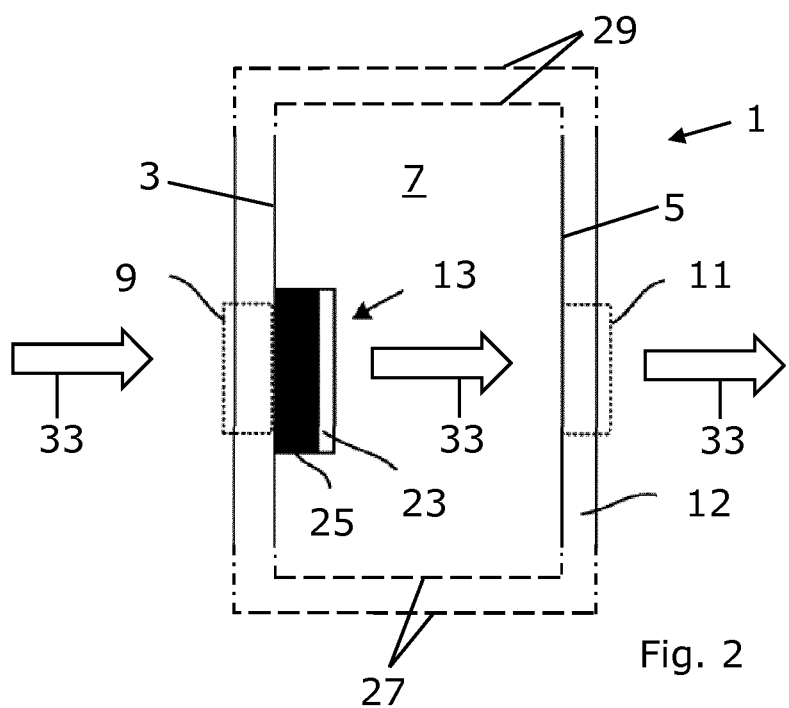
Figure 3:
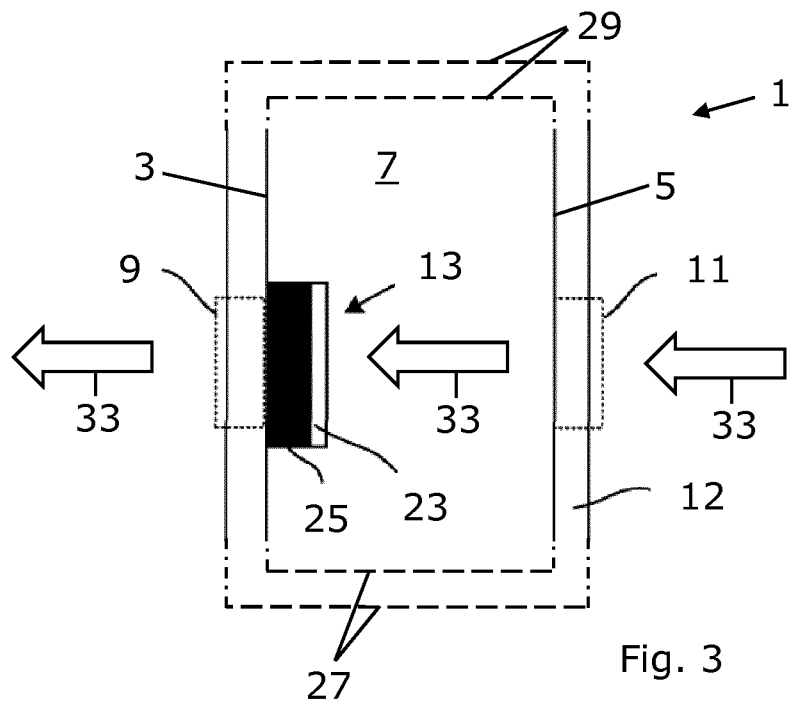

In one embodiment, the liquid container 1 forms part of a flow path wherein the liquid to be characterised flows in a flow path intercepting the light path, the light path and the direction of the light being illustrated by arrows 33 in FIGS. 2 and 3. The flow path is perpendicular to the plane in which the illustrations of FIGS. 1-3 are drawn. The flow of the liquid is controlled to be zero during recording of the first and second transmission spectra. This allows for characterising a change in particle composition in the liquid. Such change may occur if due to, e.g., a chemical reaction of particles in the liquid, a decay of particles in the liquid or a flow of particles relative to the liquid. These processes may be analysed by adding steps of recording consecutive sets of first and second transmission spectra at consecutive points in time and consecutive amounts of 'flow propagation'. Herein flow propagation refers to flow of liquid propagating past the first and second surfaces 3,5 intercepting the light path.

FIG. 2 illustrates the orientation of the first and second surfaces 3,5, the interior 7 and the photonic crystal 13 relative the light path and the direction of the light therein indicated by arrows 33. Accordingly, FIG. 2 illustrates the situation when recording a first transmission spectrum wherein part of the first and second container surfaces 3,5, the interior 7 containing liquid and the photonic crystal 13 intercept the light path, and the interior 7 intercepts the light path before the photonic crystal 13.

In the illustration of FIG. 3, the direction of the direction of the light in the light path indicated by arrows 33 are opposite that in FIG. 2. Accordingly, FIG. 3 illustrates the situation when recording a second transmission spectrum, wherein at least part of the first and second container surfaces 3,5, the interior 7 containing liquid and the photonic crystal 13 intercept the light path, and the photonic crystal 13 intercepts the light path before the interior 7.

A third transmission spectrum may also be recorded, wherein the light path is not intercepted by the photonic crystal. In the case of the liquid container 1 being a cuvette defining two sets of opposing cuvette walls, one of the sets of opposing walls comprising the first and second container surfaces 3,5, the other set then does not comprise a photonic crystal. The third spectrum may then be recorded by rotating the light path relative to the cuvette, or the cuvette relative to the light path, by 90 degrees in respect of the mutual orientations during recording of the first or second transmission spectrum. The third transmission spectrum allows recording of an absorption or attenuance spectrum. An attenuance spectrum represents losses due to absorbance, scattering and luminescence.

Figure 6:
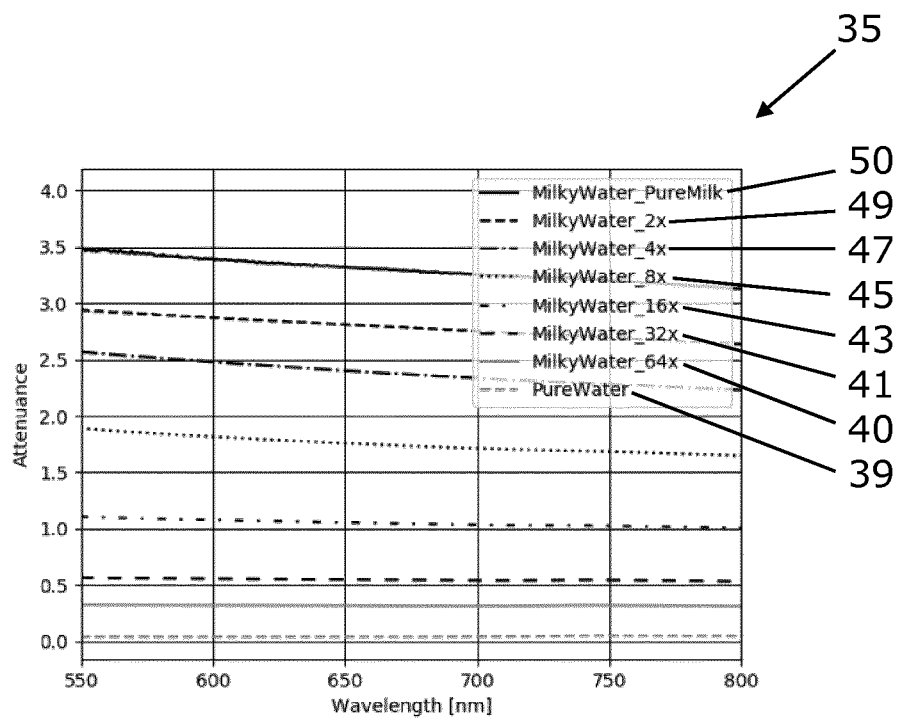
FIGS. 6-12 illustrate plots of transmission spectra recorded according to an embodied method.

FIG. 6 illustrates a plot 35 of absorbance or attenuance spectra recorded for Air 37, pure water 39, milk diluted 64 times by water 40, milk diluted 32 times by water 41, milk diluted 16 times by water 43, milk diluted 8 times by water 45, milk diluted 4 times by water 47, milk diluted 2 times by water 49, and pure milk 50. As observable from FIG. 6, the spectra shows a relatively small wavelength dependency leading to a relative large margin of error on any size estimates derived therefrom. The absorbance or attenuance spectra of FIG. 6 derive from recorded third transmission spectra. The third transmission spectra are advantageously deducted from corresponding first and second transmission spectra for removing any contribution from absorbance in the first and second transmission spectra.

Figure 7:
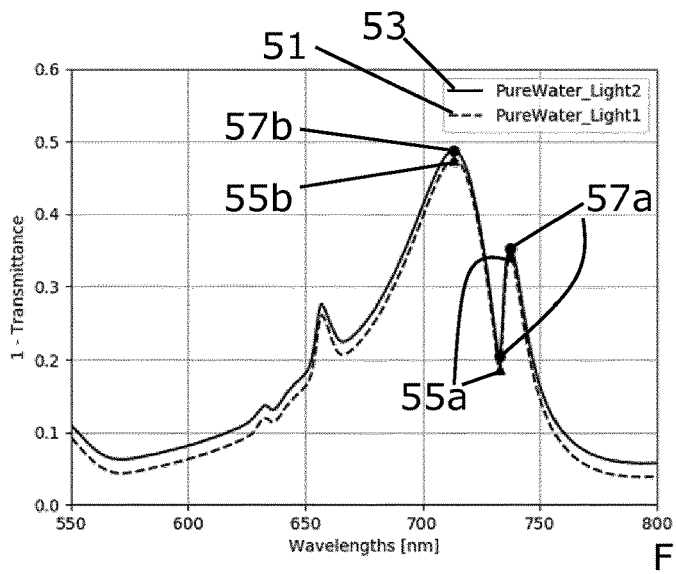
Figure 8:
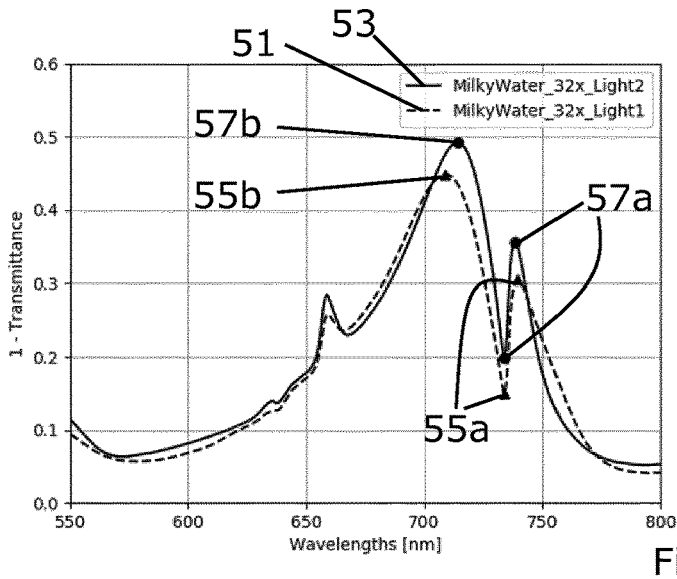
Figure 9:
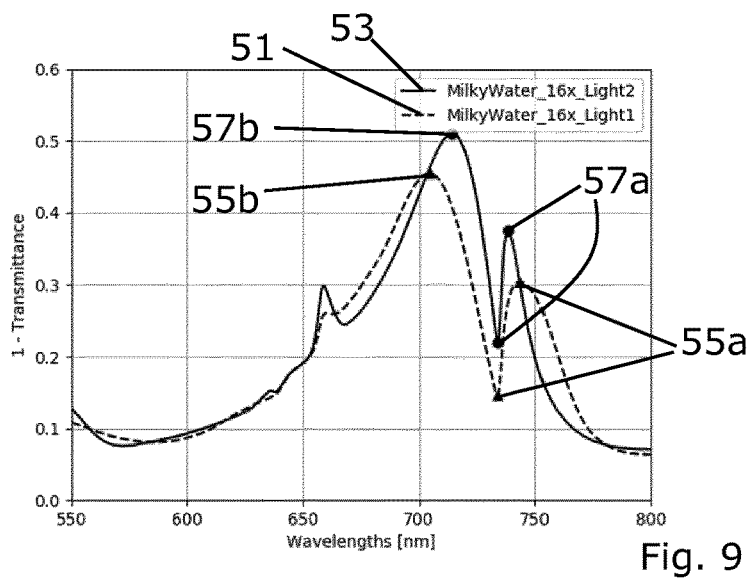
Figure 10:
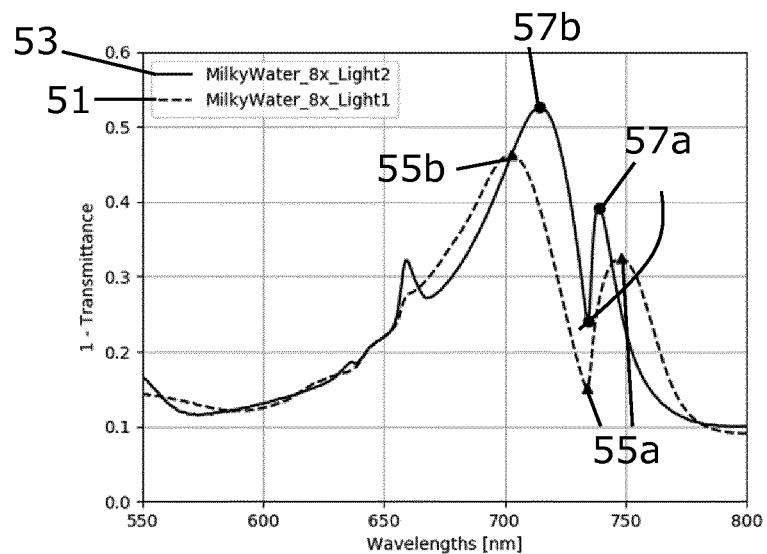
Figure 11:
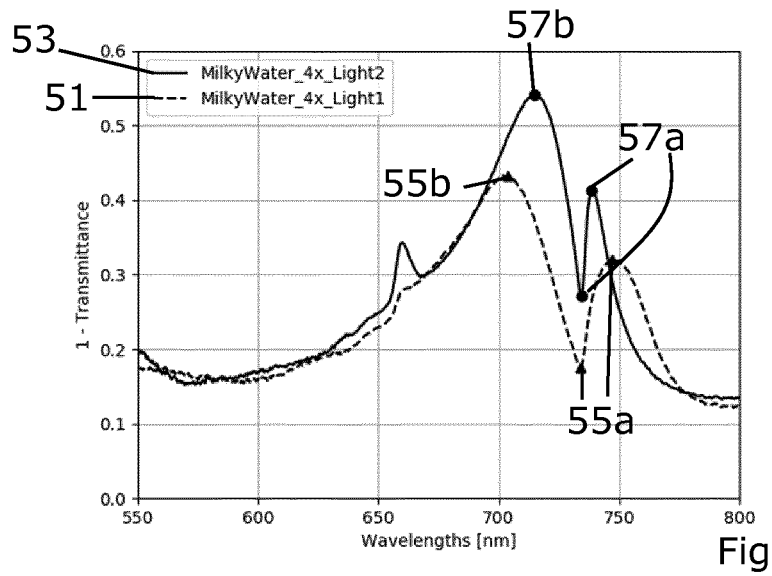

The plot in FIG. 7 shows graphs representing first and second transmission spectra 51,53 recorded with pure water in the interior 7 of the liquid container 1.

Figure 12:
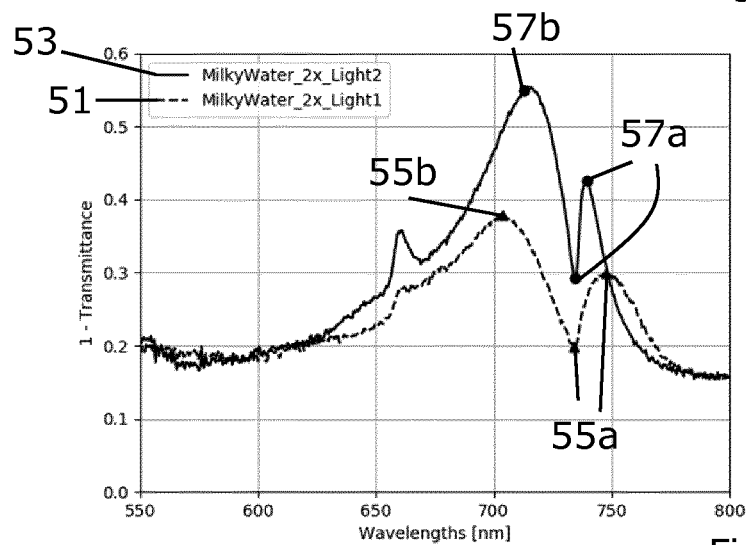

The plots in FIGS. 8-12 show graphs for first transmission spectra 51, and second transmission spectra 53 recorded on milk diluted 32 times (in FIG. 8), 16 times (in FIG. 9), 8 times (in FIG. 10), 4 times (in FIG. 11) and diluted 2 times in FIG. 12.

As is evident from the plots, the photonic crystal 13 gives rise to a first resonant wavelength band. As is clear from the graphs of first and second transmission spectra 51,53 in FIG. 7, pure water does not significantly shift the bands. This is because the water is pure and does not scatter the light significantly.

Each of the graphs of first and second transmission spectra 51,53 in FIGS. 8-12 shows resonance features observable where the wavelength of the incident light in the light path corresponds to a characteristic wavelength of the photonic crystal 13. The energy of the resonant angle modes split up in accordance with the incident angle of light hitting the photonic crystal 13. Such a split up is observable in each of FIGS. 7-12 marked at the extrema indicated by triangles 55a, 55b in the first transmission spectra 51 and dots 57a, 57b in the second transmission spectra 53. By comparative analysis of the position of each of the extrema 55a, 55b in the graphs of the first transmission spectra 51 and the position of each of the extrema 57a, 57b in the second transmission spectra 53, the average size and size distribution of particles in the water or diluted milk are derivable by use of Mie theory and Rayleigh scattering theory as described in more detail in the general description above and below. A quantitative measure of the amount of scattering caused by particles in the water or diluted milk is also derivable.

Figure 13:
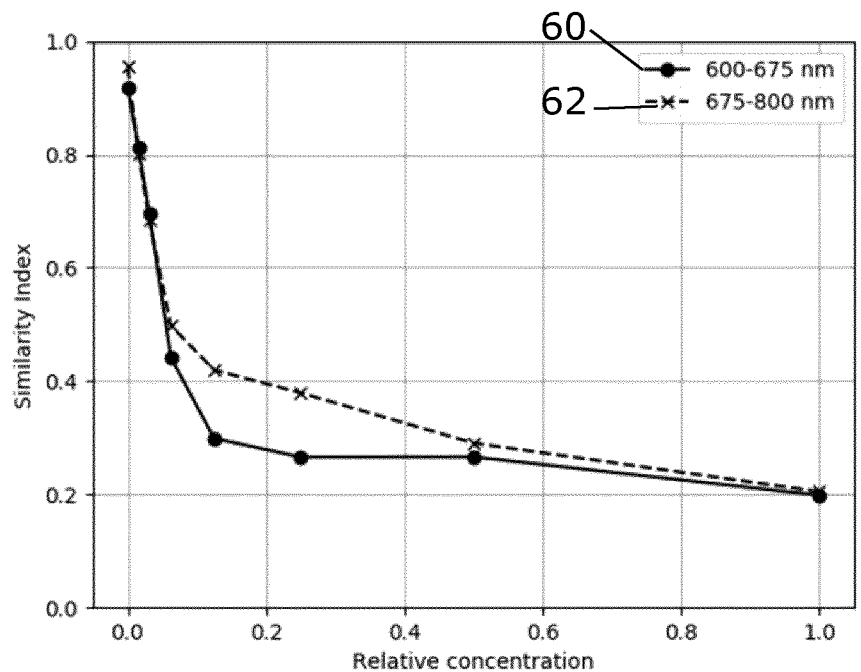
FIGS. 13-30 illustrate various plots of experimental data obtained according to an embodied method.

FIG. 13 illustrates a plot of a so-called similarity index calculated from the first and second transmission spectra 51, 53 recorded on milk at the various degrees of dilution as plotted in FIGS. 8-12. In FIG. 13, a relative concentration of 0 corresponds to pure water, while a relative concentration of 1 corresponds to the concentration of the stock solution, i.e. pure milk.

The similarity of the first and second transmission spectra 51, 53 are quantified in the similarity index plot by finding the ratio at which the first and second transmission spectra 51, 53 overlap. This is done based on the first derivative of each spectrum, as this allows quantification of changes in recorded values rather than changes in absolute values. The calculation generally goes as follows and is not limited to use in any particular embodiment:

for each set of first and second transmission spectra, the first order derivative is calculated;

for each set of first and second transmission spectra, the calculated first order derivative is plotted as first and second derivative curves;

for a given wavelength interval, an overlapping area under both of the first and second derivative curves is calculated, i.e. the sum of the areas under the lowest one of the derivative curve for each wavelength value of the interval;

for the given wavelength interval, the communion area under at least one of the first and second derivative curve is calculated, i.e. the sum of the areas under the highest one of the derivative curve for each wavelength value of the interval;

the overlapping area is divided by the communion area for the given wavelength interval and the resulting number between 1 and 0 is plotted for the given wavelength interval.

By comparing the first and second transmission spectra 51, 53 in this way, it is quantified how much the spectra are different from each other and, importantly, thereby the amount of scattering in the liquid is quantified.

The similarity indexes are plotted for two intervals of the spectra; 600-675 nm 60 and 675-800 nm 62. The intervals represent wavelength intervals where different resonance modes are present. The modes will split differently depending on the incident angle distribution of the incoming light. By observing the difference between the resonance modes, it is possible to determine the angle distribution of incoming light and from this, determine the forward light scattering and the cell concentration. This method can determine the concentration isolated from the attenuance (sometimes also referred to as absorbance).

Correspondingly computed similarity index plots 60, 62 calculated from experimentally determined first and second transmission spectra 51, 53 are illustrated in FIGS. 15, 18, 25 and 28.

Figure 15:
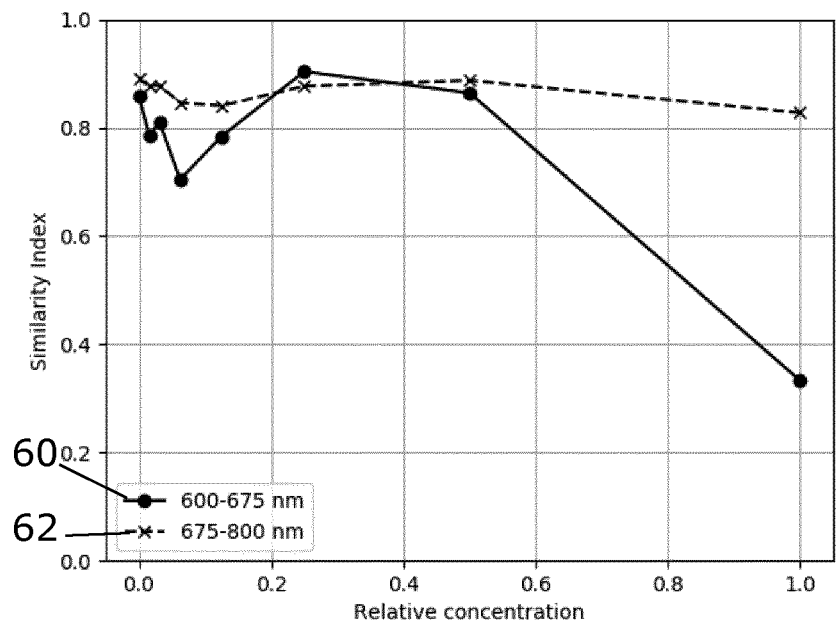
Figure 16:
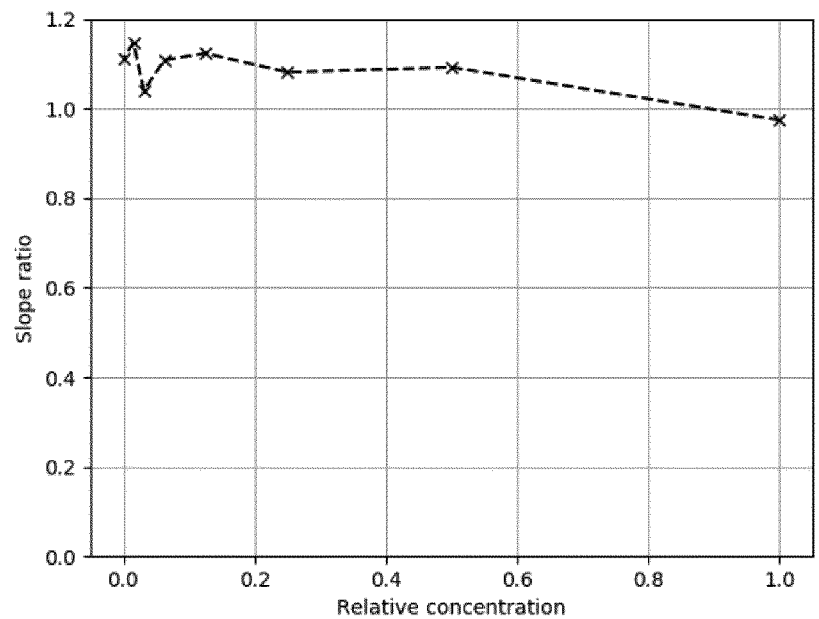

In FIG. 15, the similarity index plots 60, 62 are calculated from first and second transmission spectra 51, 53 recorded on 100 nm polystyrene bead reference samples.

Figure 18:
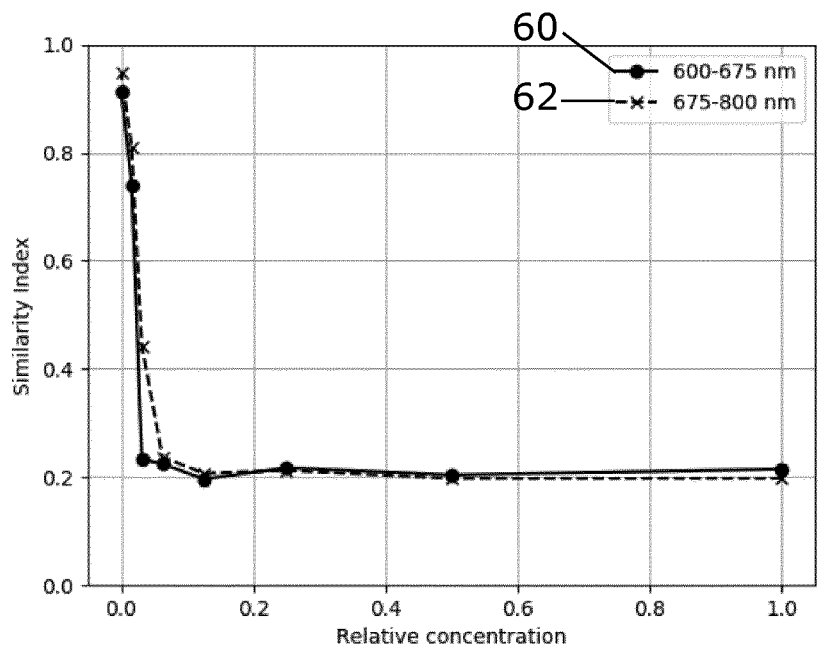

In FIG. 18, the similarity index plots 60, 62 are calculated from first and second transmission spectra 51, 53 recorded on 600 nm polystyrene bead reference samples.

Figure 21:
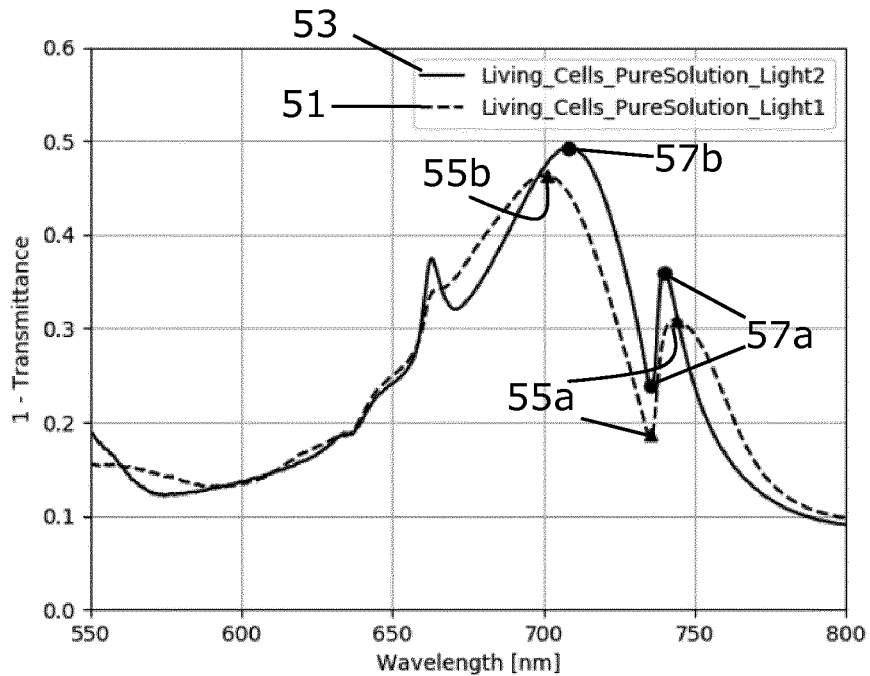
Figure 22:
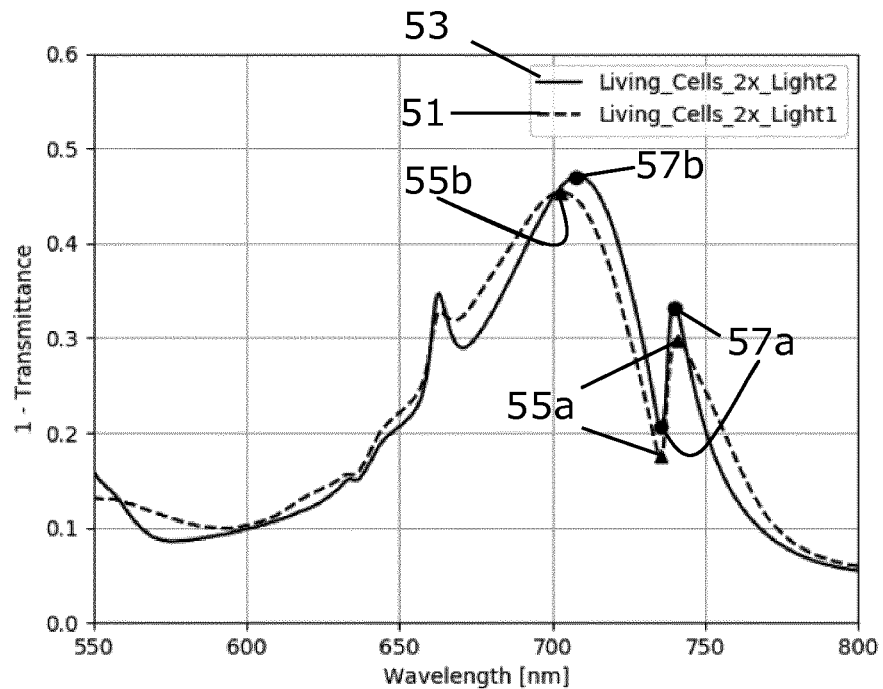
Figure 23:
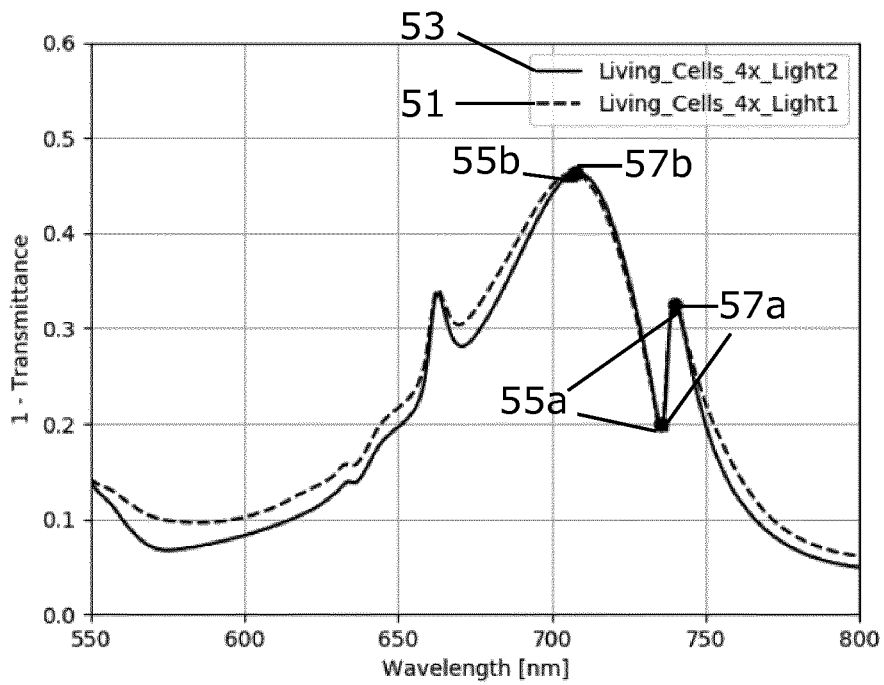
Figure 24:
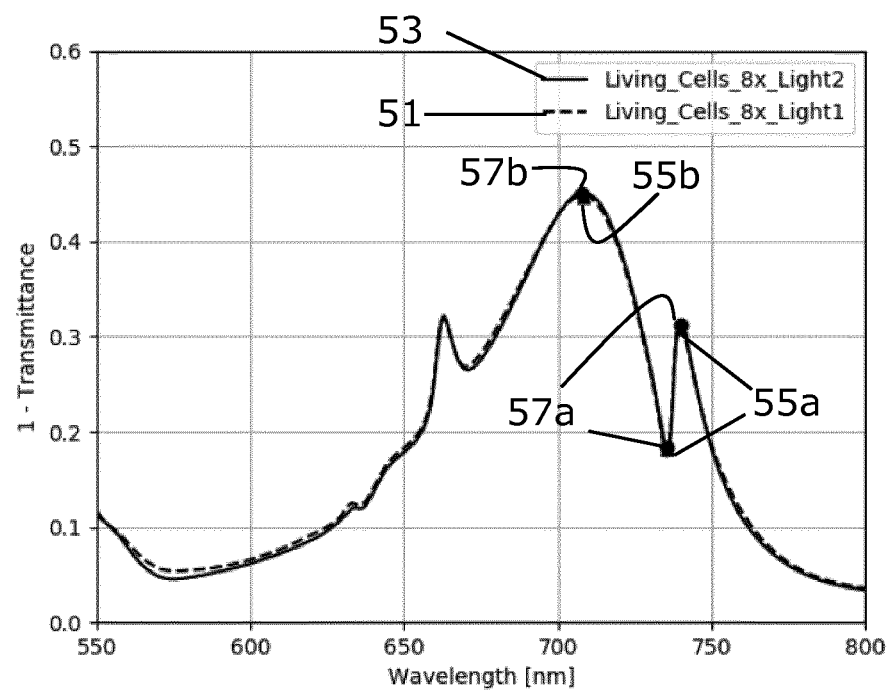
Figure 25:
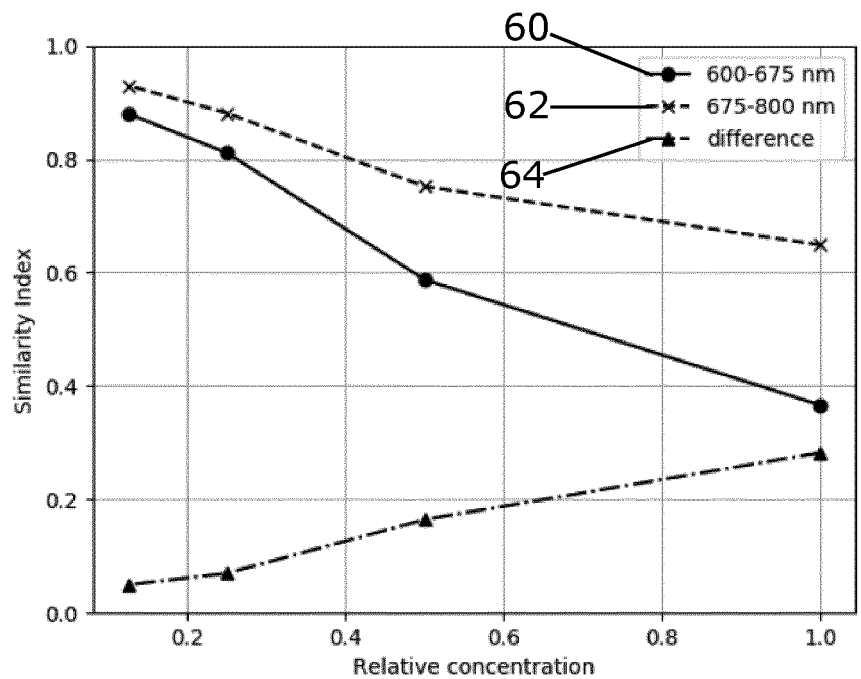
Figure 26:
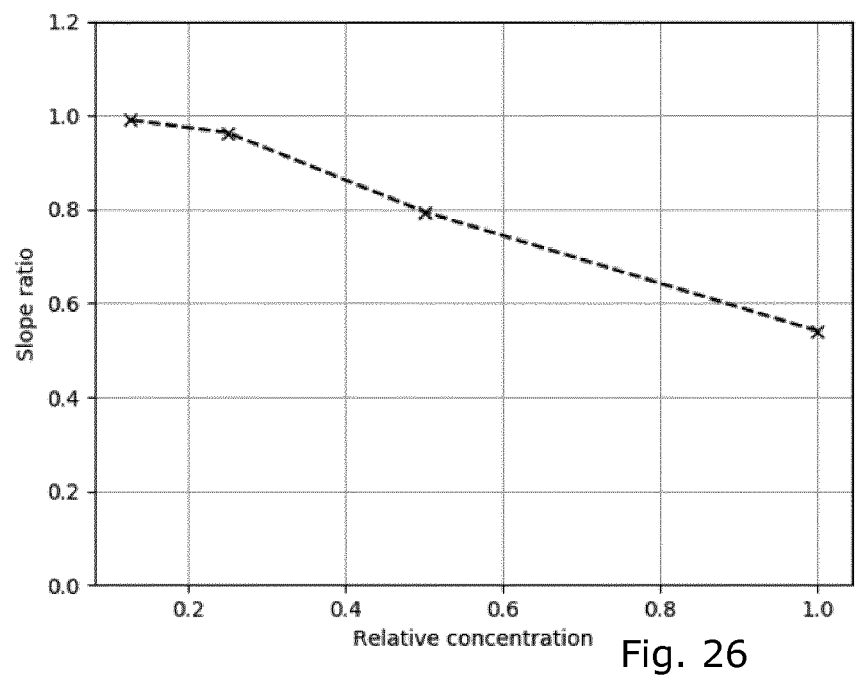

In FIG. 25, the similarity index plots 60, 62 are calculated from first and second transmission spectra 51, 53 recorded on liquid samples with live E. coli bacteria cells dispersed in water. The index plots 60, 62 of FIG. 25 are calculated from the first and second transmission spectra 51, 53 illustrated in FIGS. 21-24. The concentration of cells varies from pure stock solution concentration in FIG. 21 and the same solution has been diluted 2× by water in FIG. 22, 4 times by water in FIG. 23, and 8 times in FIG. 24. Moreover, the same live E. coli bacteria cells are measured on in the transmission spectra recorded in all of FIGS. 21-24. The method of the invention thus allows quantitative scattering and concentration analysis on live samples of cells.

Figure 28:
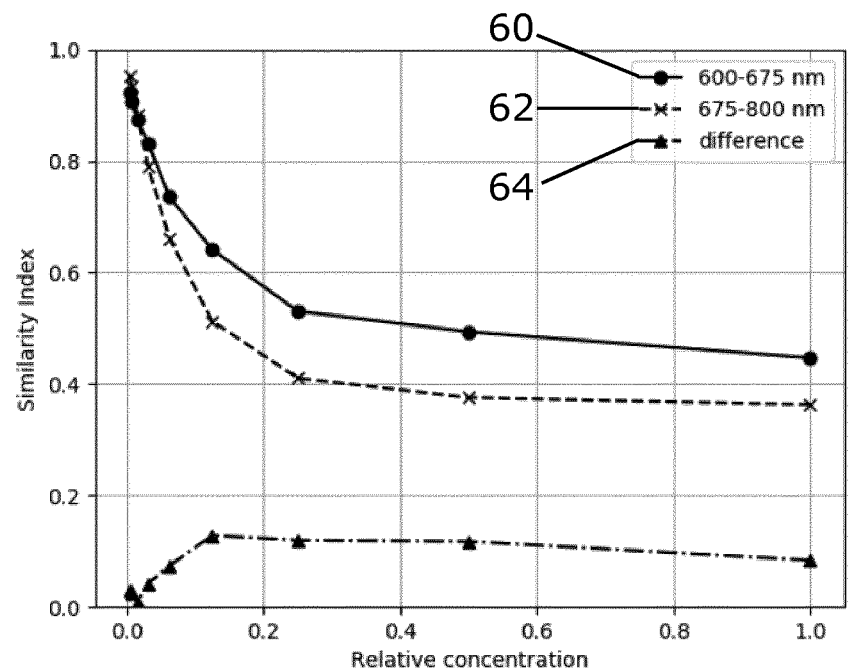

In FIG. 28, the index plots 60, 62 are calculated from first and second transmission spectra 51, 53 recorded on liquid samples with live yeast cells.

As is evident from the similarity index plots 60 and 62 in FIGS. 13, 15, 18, 25 and 28 the similarity generally decreases as the relative concentration increases. This shows how a higher concentration generally increases splitting of modes and the forward scattering of the light in the liquid. By using proper machine calibration and quantitative data analysis tools, the concentration of particles, exemplified also by live E. coli bacteria cells and live yeast cells, can be calculated.

FIGS. 25 and 28 further comprises a 'difference' plot 64 calculated as the difference between the similarity factor calculated for the 600-675 nm interval 60 and the similarity factor calculated for the 675-800 nm interval 62. This provides yet a quantitative measure, which can be used in the computation of the size distribution and/or average particle size.

FIGS. 14, 16, 19, 26 and 29 are all slope ratio spectra. For any given set of first and second transmission spectra 51, 53, the slope ratio is calculated as the ratio between a first slope between the extrema 55a of the first transmission spectrum 51, and a second slope between the extrema 57a of the second transmission spectrum. This is repeated for each relative concentration.

The slope between the extrema 55a of the first transmission spectra 51 and the slope between the extrema 57a of second transmission spectra 53 is a quantitative way of measuring a resonance mode split. The slope ratio indicates a difference in resonance mode split between the first and second transmission spectra 51, 53. The average size and in some cases the size distribution of particles can be quantified from comparative analysis of the splitting of a resonance mode in the first and second transmission spectra 51, 53.

As is evident from the plots in FIGS. 14, 16, 19, 26 and 29, the slope ratio generally decreases with relative concentration. This shows that as the concentration increases, the resonance mode is increasingly splitting. An increasingly splitting resonance mode indicates a larger average size or broader size distribution of particles.

This comes from a larger average size or broader size distribution of particles leading to a larger forward scattering and a larger incoming angle distribution of the incident light 33 on the photonic crystal 13 leading to a split in resonance mode.

Figure 14:
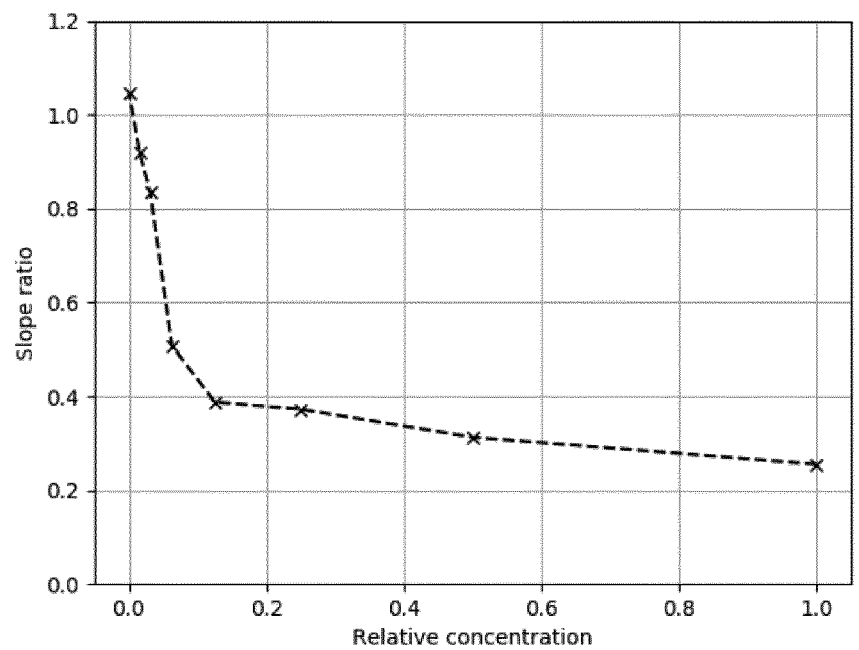
Figure 19:
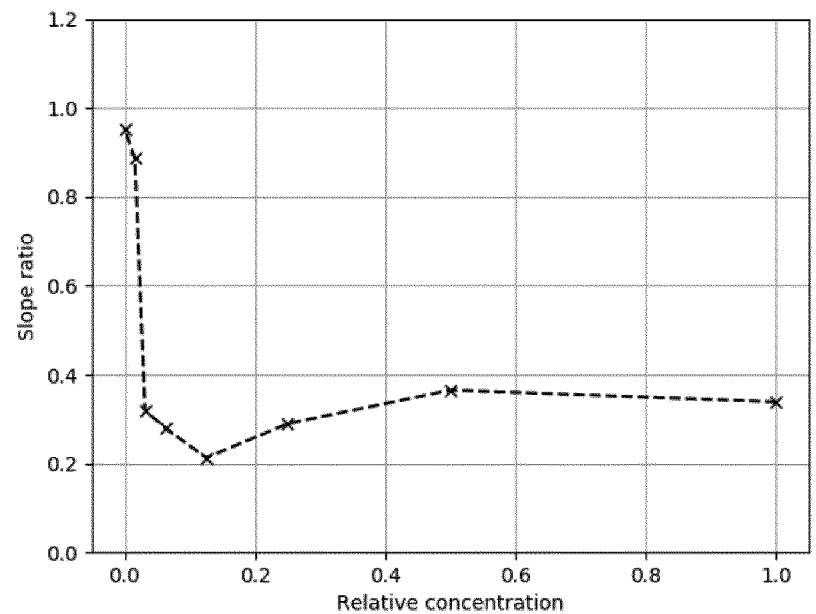
Figure 29:
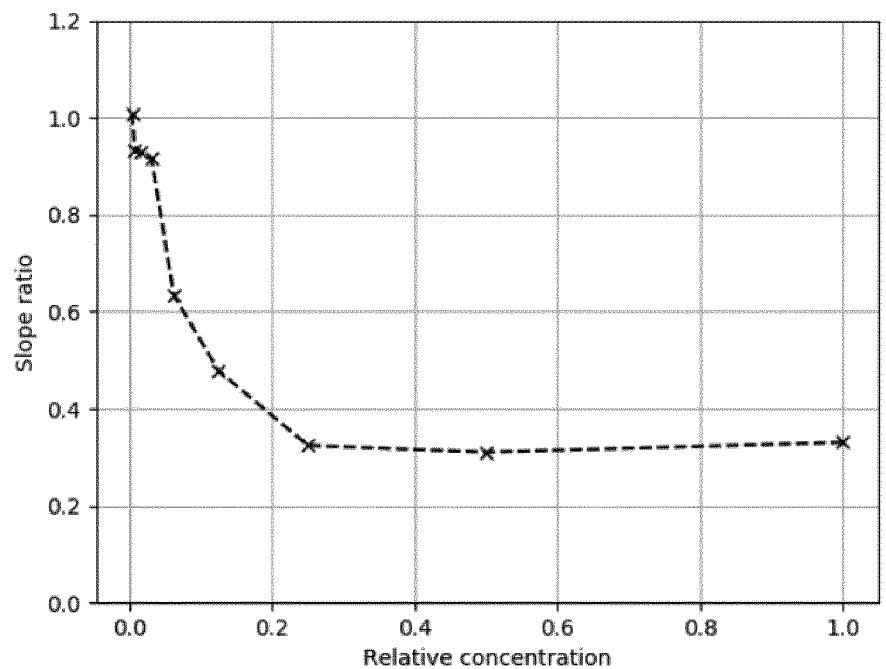

The slope ratios of FIGS. 14, 19, 29 as well as the similarity index of FIGS. 15, 18 and 28 appear to saturate toward some constant value for sufficiently large relative concentrations.

This is most likely an indication that light in the light path 33 has been scattered beyond the outer barrier of the optical sensor. This effect of light having been scattered beyond the limits of the detector is also seen when comparing, e.g., the first and second transmission spectra 51, 53 of FIGS. 8 and 12, wherein the value of the extrema 55a, 55b of the first spectrum 51 is significantly smaller than the value of the extrema 57a, 57b of the second spectrum 53 for the relatively high concentration of FIG. 12, whereas this effect is much less significant for the first and second transmission spectra 51, 53 for the relatively low concentration of FIG. 8.

Significantly however, the saturation value for the similarity index of the 600 nm polystyrene particles in FIG. 18 is much smaller than for the similarity index of the 100 nm polystyrene particles in FIG. 15. This provides a quantitative indication of a difference in particle size on the basis of the analysis of first and second transmission spectra 51, 53.

Moreover, each of the curves of the similarity index' and slope ratios provide quantitative data, which can be comparatively analysed and lead to derivation of particle concentration and/or particle size distribution and/or average particle size.

Figure 17:
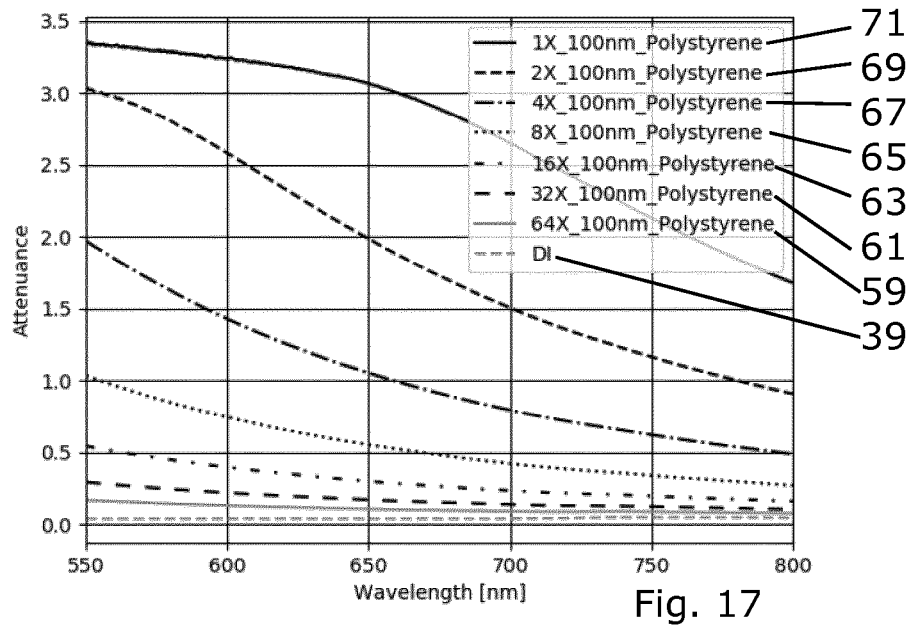

FIG. 17 illustrates a plot of attenuance spectra recorded derived from third transmission spectra recorded on for pure water 39, polystyrene 100 nm beads stock solution diluted by water to 1.5625% vol (64×) 59, polystyrene 100 nm beads stock solution diluted by water to 3.125% vol (32×) 61, polystyrene 100 nm beads stock solution diluted by water to 6.25% vol (16×) 63, polystyrene 100 nm beads stock solution diluted by water to 12.5% vol (8×) 65, polystyrene 100 nm beads stock solution diluted by water to 25% vol (4×) 67, polystyrene 100 nm beads stock solution diluted by water to 50% vol (2×) 69 and pure polystyrene 100 nm beads stock solution 51% vol (1×) 71.

FIG. 17 shows a wavelength dependency on the attenuance due to the particles' radius being relatively small compared to the incident light's wavelengths.

Figure 20:
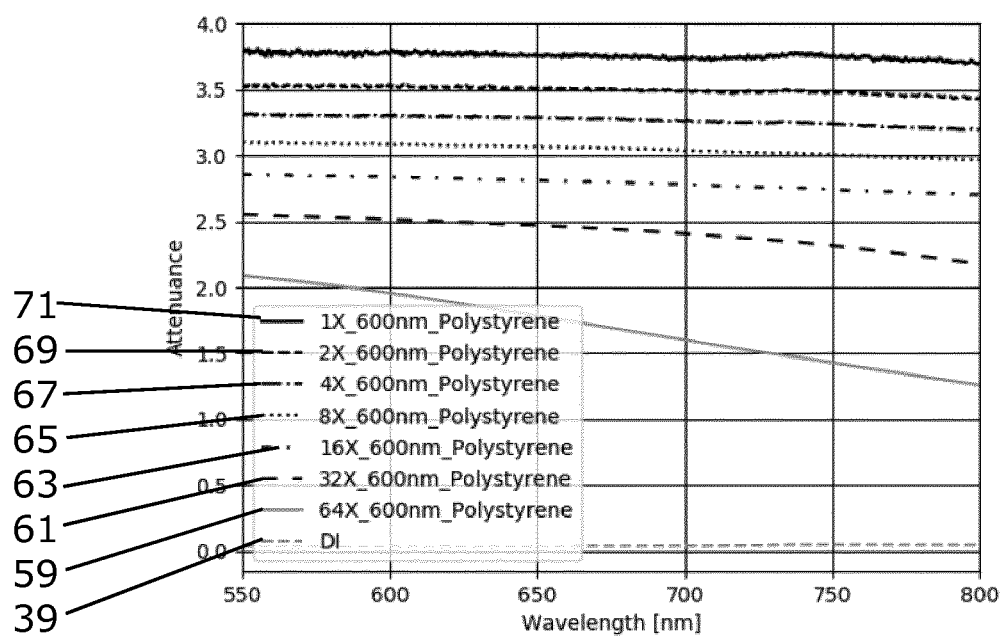

Corresponding attenuance spectra are plotted in FIG. 20 for 600 nm polystyrene beads. The wavelength dependency is less significant, albeit present, for the 600 nm polystyrene beads.

Figure 27:
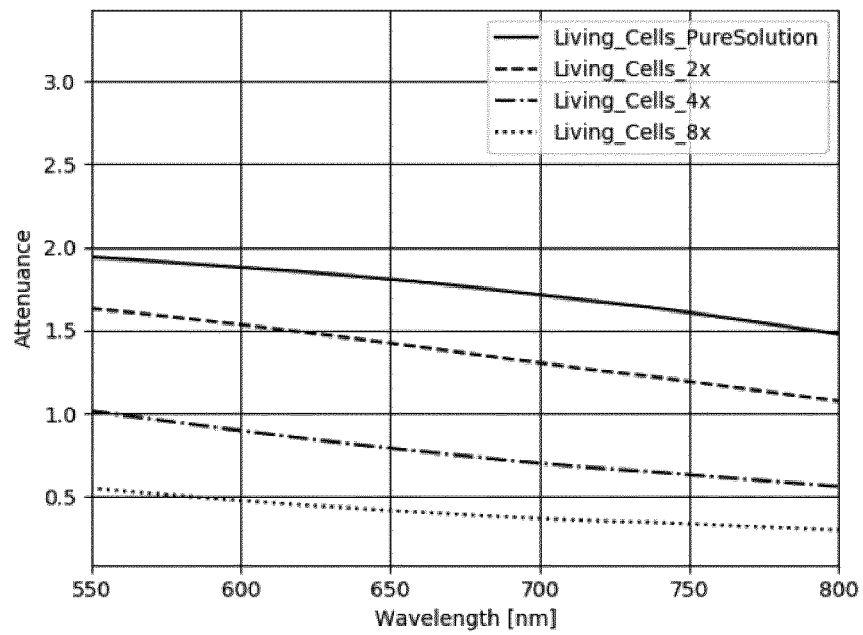
Figure 30:
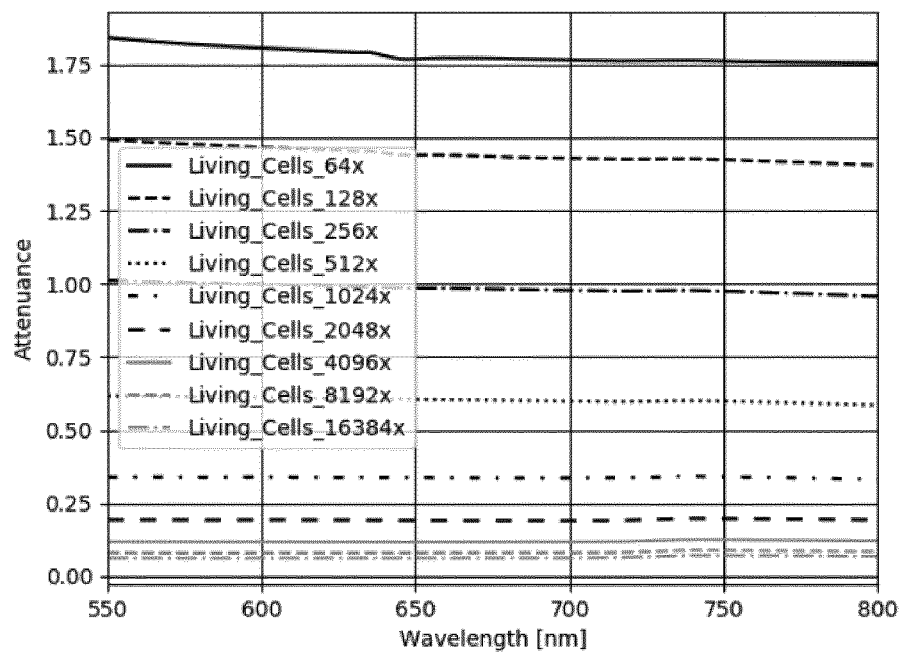

As evident from the attenuance spectra in FIG. 27 and FIG. 30 deriving from third transmission spectra recorded on live E. coli bacteria cells and yeast cells, respectively, little characteristic features occur in the attenuance spectra as the concentration of particles changes. The attenuance spectra recorded as third transmission spectra do, however, allow for isolation of absorbance features from scattering features by comparison with the respective first and second spectra.

Generally, when a plane wave encounters a perfect sphere, a particle, or a biological cell, then some of the light will be absorbed and some will be scattered. These processes can be calculated by scattering theory for various particle sizes. The Mie solution to Maxwell's equations (also known as the Lorenz-Mie solution, the Lorenz-Mie-Debye solution or Mie scattering) describes the scattering of an electromagnetic plane wave by a homogeneous sphere. The solution takes the form of an infinite series of spherical multiple partial waves. It can be used to calculate light scattering by non-absorbing, partially-absorbing, or perfectly conducting spheres.

In terms of definitions, the extinction efficiency (scattering or absorption) is the ratio of an extinction (scattering or absorption) cross-section to a particle's geometric cross-sectional area. The extinction efficiency with respect to a particle is defined as the sum of the scattering efficiency and the absorbance efficiency, while the scattering anisotropy is a measure of the amount of forward direction retained after a single scattering event and is defined with respect to the average cosine of the scattering phase function. The attenuation measured by a spectrophotometer can be calculated by multiplying the extinction efficiency with the length of the light path, the concentration and a mathematical constant of base 10 logarithm to Euler's number.

Simulated spectra are provided in FIGS. 31-34. The implementation used to generate the simulated spectra in FIGS. 31-34 is the Python library "Miepython", following the procedure given by Wiscombes MIEV0 code. This simulation framework is used to calculate the extinction efficiency, scattering efficiency, backscattering and scattering asymmetry of spherical particles of a given diameter. The simulated spectra are for polystyrene beads in water. The optical constants for water are taken from "High performance liquid chromatography (HPLC) distilled water at 21.5° C.", Appl. Opt. 46, 3811-3820 (2007).

Polystyrene particles are often used a reference system to understand and quantify processes involving scattering, including calibration of equipment. Therefore, the calculations underlying the results seen in in FIGS. 31-34 are performed for polystyrene particles with tabulated optical properties taken from N. Sultanova, S. Kasarova and I. Nikolov, Dispersion properties of optical polymers, Acta Physica Polonica A 116, 585-587 (2009).

Figure 31:
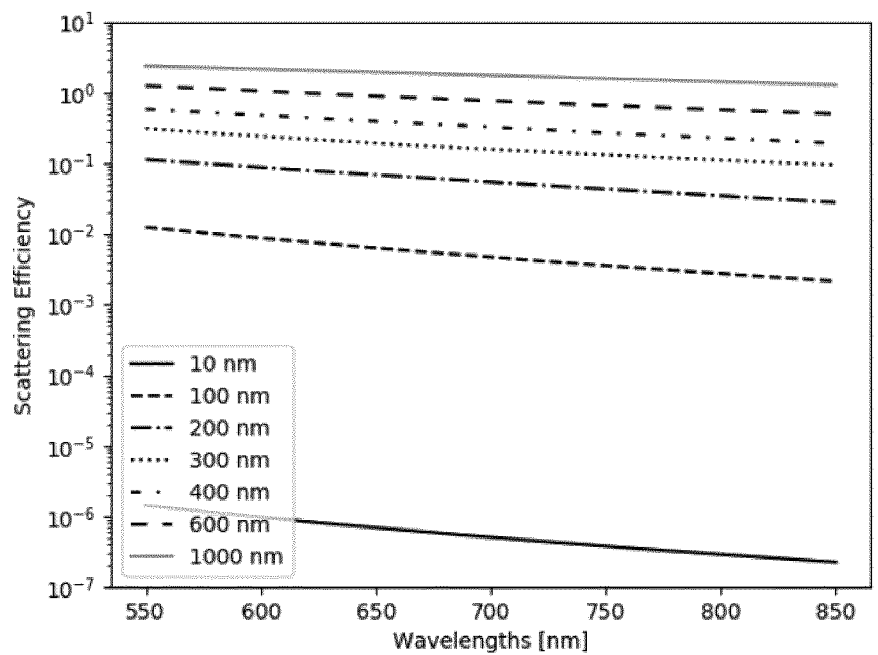
FIGS. 31-34 illustrate various plots of simulated data.

In FIG. 31, the simulated results for scattering efficiency of a single particle are plotted as function of wavelength in the interval 570 nm-850 nm for various particle diameters ranging from 10 nm to 1000 nm. For all particle diameters between 10 and 1000 nm, it is seen that the scattering efficiency decreases for longer wavelengths of the incident light compared to shorter wavelength within the visual spectrum. However, by compared the resulting spectra for different diameters between 10 nm and 1000 nm, it is seen that the scattering efficiency in the visual range of a particle increases almost eight orders of magnitude when particle diameter is increased from 10 nm to 1000 nm. This indicates a strong correlation between particle size and scattering of incident light on the particle.

Figure 32:
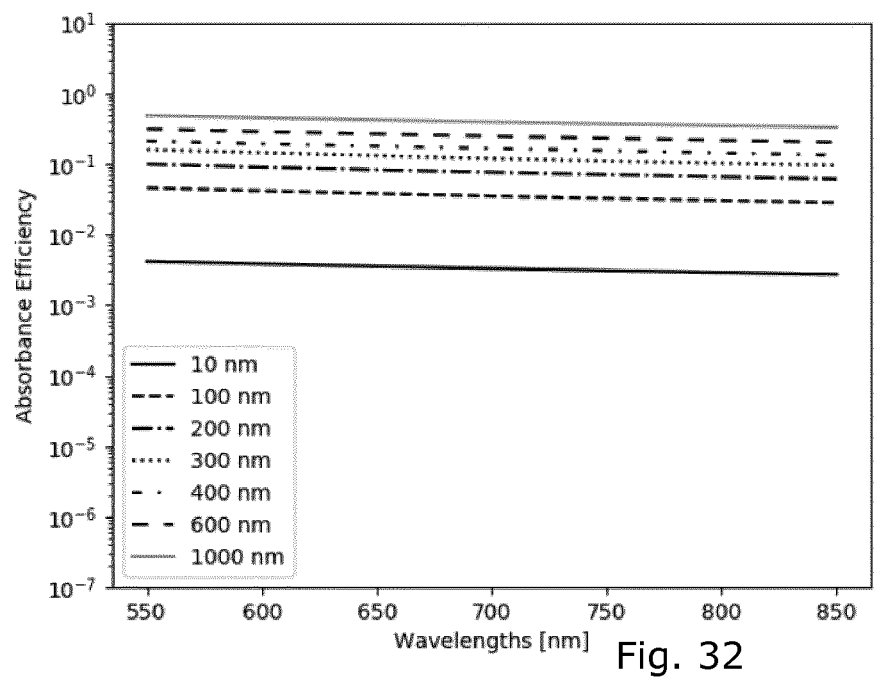

In FIG. 32, the simulated results for absorbance efficiency of a single particle are plotted as function of wavelength in the interval 570 nm-850 nm for various particle diameters ranging from 10 nm to 1000 nm. For all particle diameters between 10 and 1000 nm, it is seen that the absorbance efficiency decreases for longer wavelengths of the incident light compared to shorter wavelength within the visual spectrum. By comparing the resulting spectra for 10 nm to 1000 nm particles diameter, it is seen that the absorbance efficiency of the particle increases less than three orders of magnitude. This indicates a stronger correlation between particle size and light scattering of a particle than between particle size and light absorbance of a particle.

Figure 33:
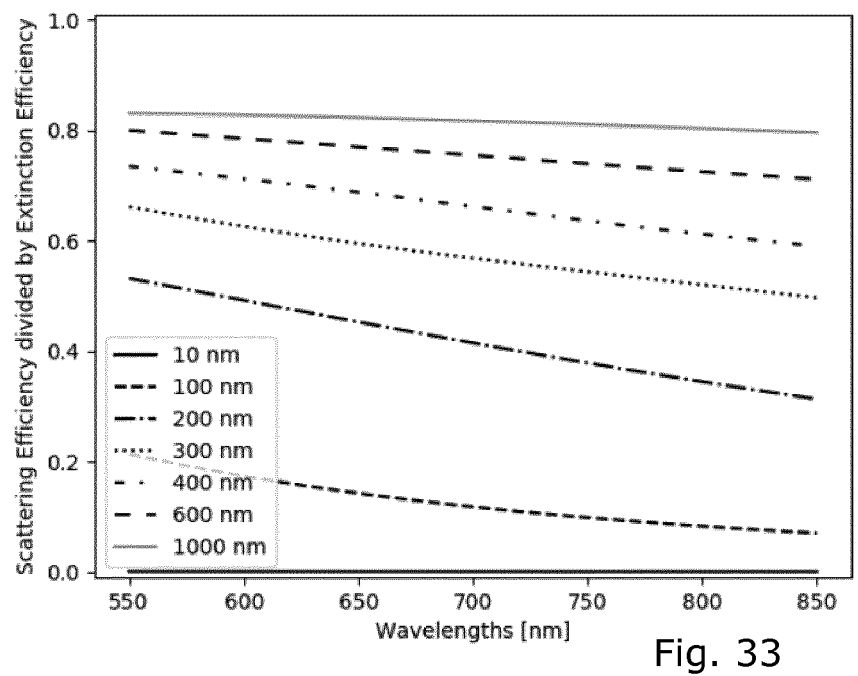

In FIG. 33, the simulated results for the scattering proportion of the total extinction efficiency are plotted as function of wavelength in the interval 570 nm to 850 nm for various particle diameters ranging from 10 nm to 1000 nm. For all particle diameters between 10 and 1000 nm, it is seen in FIG. 33 that the ratio of scattering efficiency to the total extinction efficiency decreases for longer wavelengths of the incident light compared to shorter wavelengths within the range 570 nm to 850 nm. For small particles around 10 nm in diameter, it is seen in FIG. 33 that the scattering efficiency is close to 0% of the total extinction efficiency, meaning that of the incident light affected by the particle almost 100% is absorbed. For smaller particles around 100 nm in diameter, it is seen in FIG. 33 that the scattering efficiency is around 20% of the total extinction efficiency, meaning that of the incident light affected by the particle around 20% is scattered and 80% is absorbed. For particles around 600 nm in diameter, it is seen in FIG. 33 that the scattering efficiency is close to 80% of the total extinction efficiency, meaning that of the incident light affected by the particle close to 80% is scattered and around 20% is absorbed. For larger particles of 1000 nm in diameter, it is seen in FIG. 33 that the scattering efficiency is above 80% of the total extinction efficiency, meaning that of the incident light affected by the particle more than 80% is scattered and less 20% is absorbed. The simulation results plotted in FIG. 33 indicates that by quantifying both scattering and absorbance properties of the same sample containing particles or biological cells, information regarding the particle size can be derived and possibly the size distribution.

Figure 34:
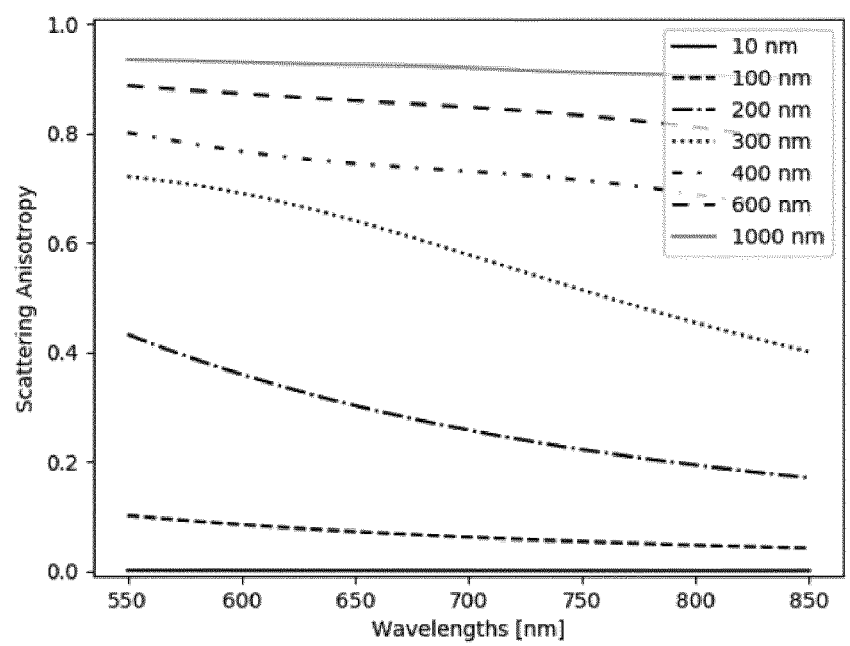

In FIG. 34, the simulated results for the scattering anisotropy are plotted as function of wavelength in the interval 570 nm-850 nm for various particle diameters ranging from 10 nm to 1000 nm. For all particle diameters between 10 and 1000 nm, it is seen in FIG. 34 that the scattering anisotropy decreases for longer wavelengths of the incident light compared to shorter wavelengths within the range 570 nm to 850 nm. For small particles around 10 nm in diameter, it is seen in FIG. 34 that the scattering anisotropy is close to 0%, meaning that of the incident light affected by the particle almost 100% is scattered uniformly in all directions, a process known as Rayleigh scattering. For smaller particles around 100 nm in diameter, it is seen in FIG. 34 that the scattering anisotropy is around 10%. For particles around 600 nm in diameter, it is seen in FIG. 34 that the scattering anisotropy is above 80%. For larger particles of 1000 nm in diameter, it is seen in FIG. 34 that the scattering anisotropy is above 90%, meaning that more than 90% of the affected incident light is retained in a forward direction after a single scattering event. The simulation results plotted in FIG. 33 and FIG. 34 indicate that by measuring both scattering and absorbance properties of the same sample containing particles or biological cells, information regarding the size can be derived and possibly the size distribution.

Figure 35:
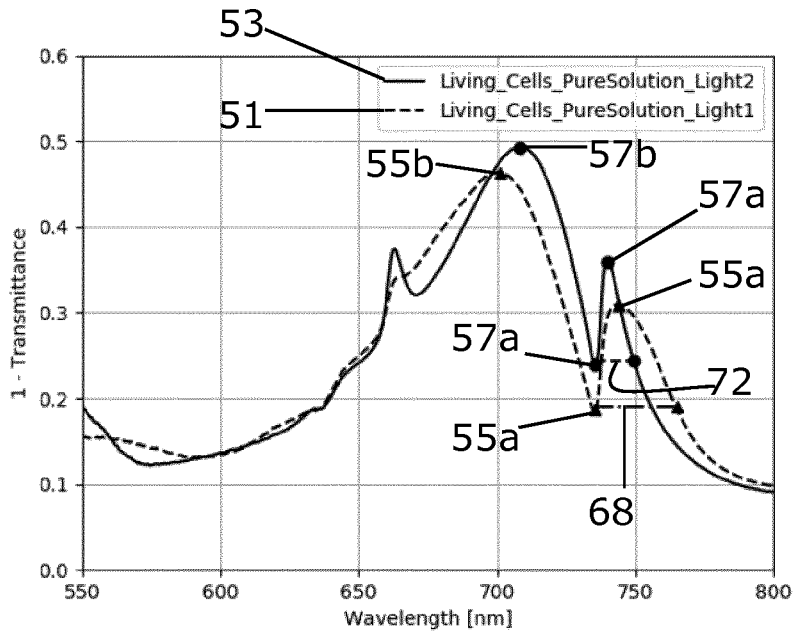
FIGS. 35-46 illustrate various plots of experimental data obtained according to an embodied method.
Figure 36:
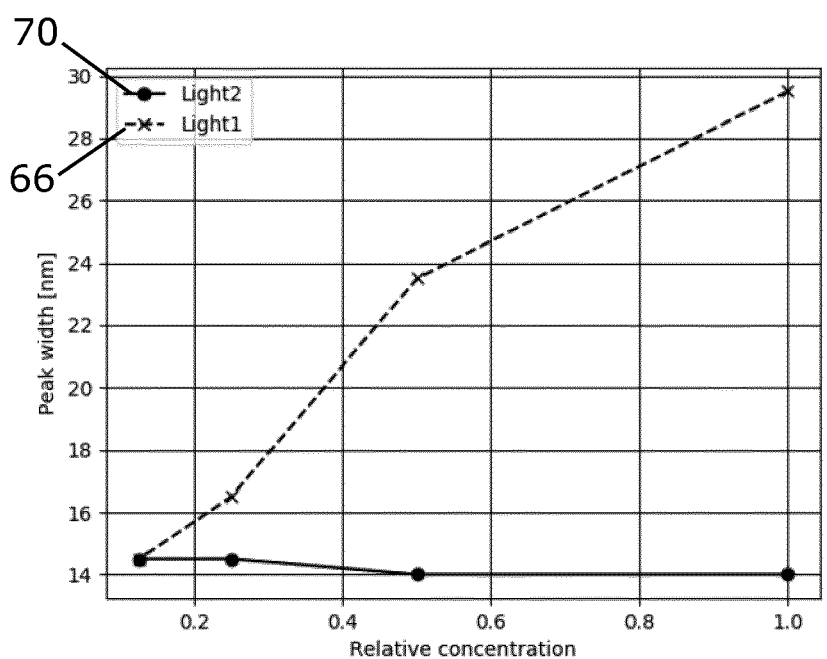

FIG. 36 is a plot of the peak width calculated from each of the first and second transmission spectra 51, 53 plotted in FIGS. 21-24 and plotted as a function of relative concentration of the live *E. coli* bacteria cells. For each spectrum, the peak width 66 of the first spectra 51 is computed as the difference in wavelength as indicated by line 68 in the exemplary first spectrum 51 in FIG. 35, and the peak width 70 of the second spectra 53 is computed as the difference in wavelength as indicated by the line 72 in the exemplary second spectrum 53 in FIG. 35. As clearly evident from FIG. 36, the peak width 66 changes significantly for the first spectra 51 as a function of concentration, while the peak width 70 is close to constant for the second spectra 53 as a function of concentration. This provides yet another example of the concentration dependency derivable from comparative analysis of first and second transmission spectra 51, 53.

The attenuance of the transmitted radiant power through a material can be defined as the sum of the absorbance, losses due to scattering and luminescence if present. In the following, we assume that the sample material or its constituents are not significantly luminescent.

A UV-Vis spectrophotometer may be used to measure attenuance. To use this instrument, solutions are placed in a small cuvette and inserted into the holder. The instrument is controlled through a computer and, once it is "blanked", it will automatically display the attenuance plotted against wavelength, known as an attenuance spectrum.

In the case of a pure absorbent sample, the attenuance equals the absorbance and a spectrum of the solution will be useful for determining the concentration of the analyte in the solution, for example using the Beer-Lambert law for some concentrations if applicable.

In the case of a pure scattering sample, the attenuance (also sometimes called optical density in this case) measures losses due to scattering and a spectrum of the solution will be useful for determining the concentration, often based on a standard curve valid within a concentration range. In addition to calculating the concentration, for particle sizes on the same order of magnitude as the incident wavelength, the spectrum may display a curvature or features that allow for an average particle size determination, or in some cases a particle distribution quantification. However for small and large particle diameters relative to the incoming wavelength, the lack of size-dependent curvatures or features in the attenuance spectra makes it difficult to fit both the concentration and size distribution, which the Agilent 7010 and other particle size spectrophotometry instruments compensate for by using a wider range of wavelengths than the visual range, for example from 190 nm to 1100 nm in wavelength. Even for dedicated instrumentation, both parameters are at best determined with great uncertainty.

In the case where both scattering and absorbent media in non-negligible quantities are mixed in a sample, the attenuance of the sample measured by a spectrophotometer or equivalent optical instrumentation will amount to the sum of the scattering and absorbent contributions (and optionally any second order high-concentration phenomena derived therefrom). In this case, conventional methods based on either absorbance or scattering calculation models fails completely. The information available in the attenuance spectra cannot properly distinguish between losses due to absorption and losses due to scattering. Hence, concentration and particle size cannot be determined. In the case of large particles compared to the incident wavelength of light, the concentration cannot be determined even if the particle size is known for scattering component, including biological cells, because the attenuance spectrum is substantially flat and the measured absolute attenuance value is based on loses from both absorption and scattering.

To demonstrate the usefulness of the invention in this regard, FIG. 37-46 display data from an experiment performed by mixing the colorant brilliant blue and the scattering yeast cells in different quantities. The brilliant blue colorant is almost exclusively absorbing with a large absorption at 628 nm, while the yeast cell are mostly light scatters being significant larger than the wavelength in the visual range.

The data displayed in FIGS. 37-46 were recorded on a UV-1800 spectrophotometer by measuring the attenuance of a liquid sample in a square transparent cuvette with a photonic crystal rigidly attached to the inside of one cuvette sidewall and then rotating the cuvette in three configurations to obtain first, second and third transmission spectra according to embodiments of the invention, such that three sustainably different spectra were recorded for the sample in question:

1. A recorded sample spectrum marked with "_Light2" where the incident light passes through the optical filter and then through the sample (second transmission spectrum 53) to finally be collected by an optical detector.
2. A recorded sample spectrum marked with "_Light1" where the incident light passes through the optical filter and then through the sample (first transmission spectrum 51) to finally be collected by an optical detector.
3. A recorded sample spectrum marked with "_Light0" where the incident light passes through the sample to finally be collected by an optical detector (third transmission spectrum 54), equal to the spectrum measured using a conventional transparent cuvette.

We refer to the collection of spectral data under these experimental conditions as a "Spectral Dataset".

Figure 37:
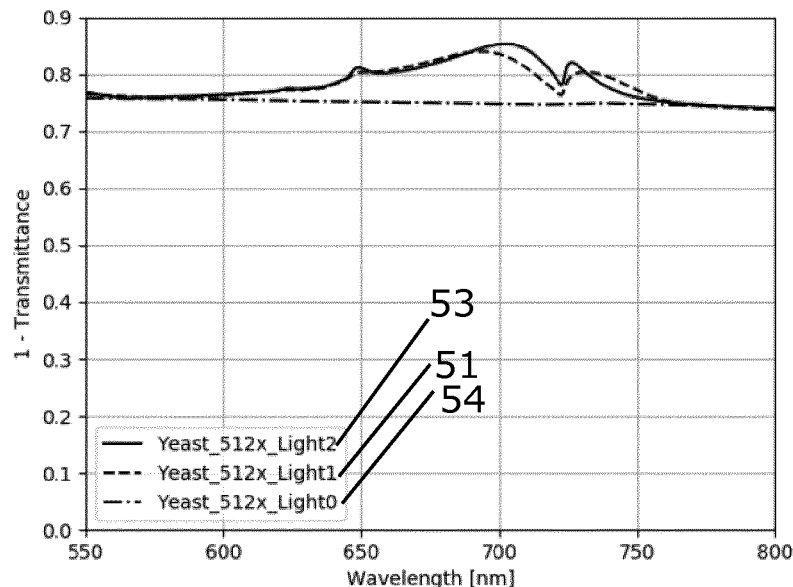

In FIG. 37, the attenuance spectra for incident wavelengths from 550 nm to 800 nm in units of 1-Transmittance are plotted for a Spectral Dataset recorded on yeast cells suspended in water. The "_Light0" spectrum clearly shows a substantially flat spectrum around 0.75. By comparing the spectral shapes of "_Light2" and "_Light1", differences can be seen indicating the yeast cells scatters the incident light significantly.

Figure 38:
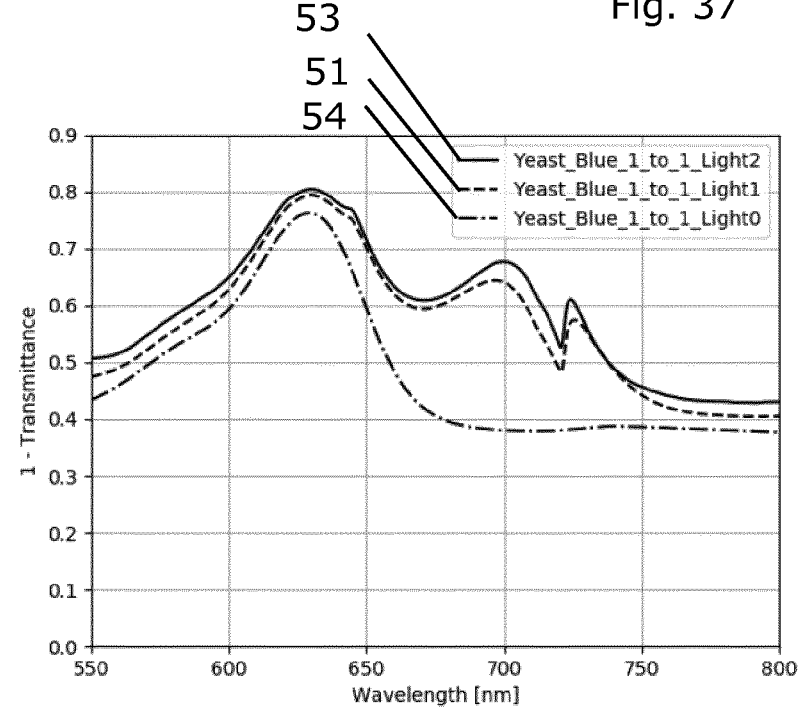

In FIG. 38, the attenuance spectra for incident wavelengths from 550 nm to 800 nm in units of 1-Transmittance are plotted for a Spectral Dataset recorded on a 1:1 mixture of yeast cells suspended in water and brilliant blue solution. The "_Light0" spectrum clearly indicates strong absorption around 628 nm on a broad background of attenuation. By comparing the spectral shapes of "_Light2" and "_Light1", differences can be seen indicating scattering of the incident light but to a much less extent than in FIG. 37.

Figure 39:
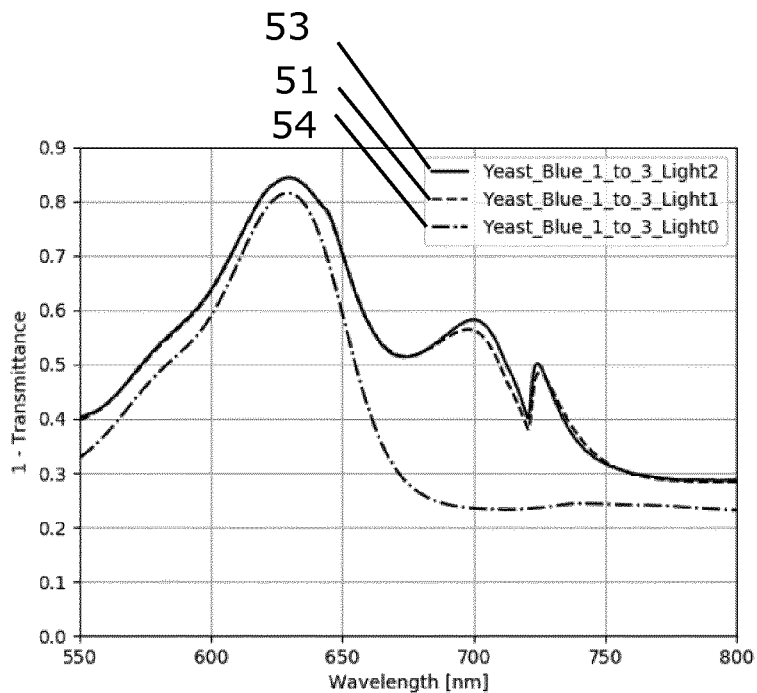

In FIG. 39, the attenuance spectra for incident wavelengths from 550 nm to 800 nm in units of 1-Transmittance are plotted for a Spectral Dataset recorded on a 1:3 mixture of yeast cells suspended in water and brilliant blue solution. The "_Light0" spectrum with a maximum around 0.8 clearly indicates absorbance around 628 nm on a broad background of attenuation less than observed in FIG. 38. By comparing the spectral shapes of "_Light2" and "_Light1", differences can be seen indicating scattering of the incident light but to a much less extent than in FIG. 37.

Figure 40:
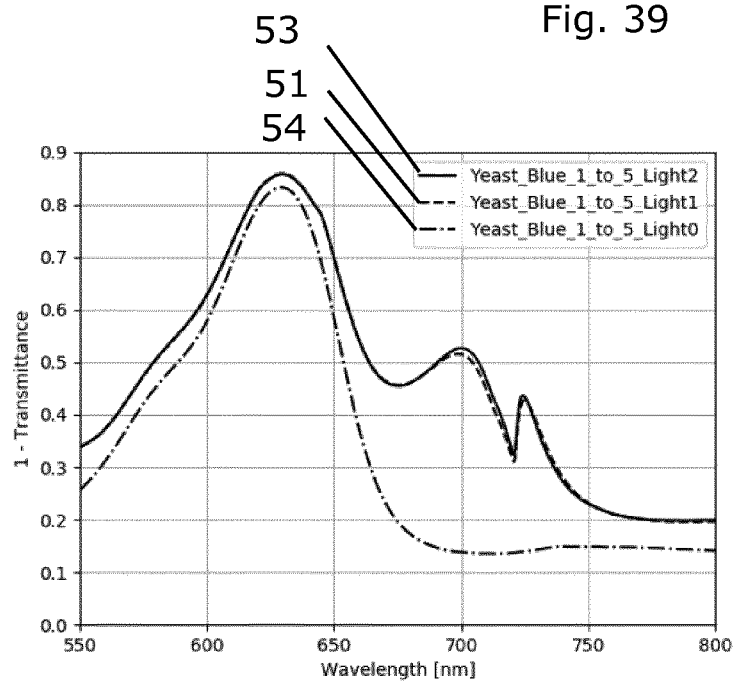

In FIG. 40, the attenuance spectra for incident wavelengths from 550 nm to 800 nm in units of 1-Transmittance are plotted for a Spectral Dataset recorded on a 1:5 mixture of yeast cells suspended in water and brilliant blue solution. The "_Light0" spectrum with a maximum around 0.8 clearly indicates absorbance around 628 nm on a broad background of attenuation less than observed in FIG. 38 and FIG. 39. By comparing the spectral shapes of "_Light2" and "_Light1", small differences can be seen indicating scattering of the incident light but to ah less extent than in FIG. 37-39.

Figure 41:
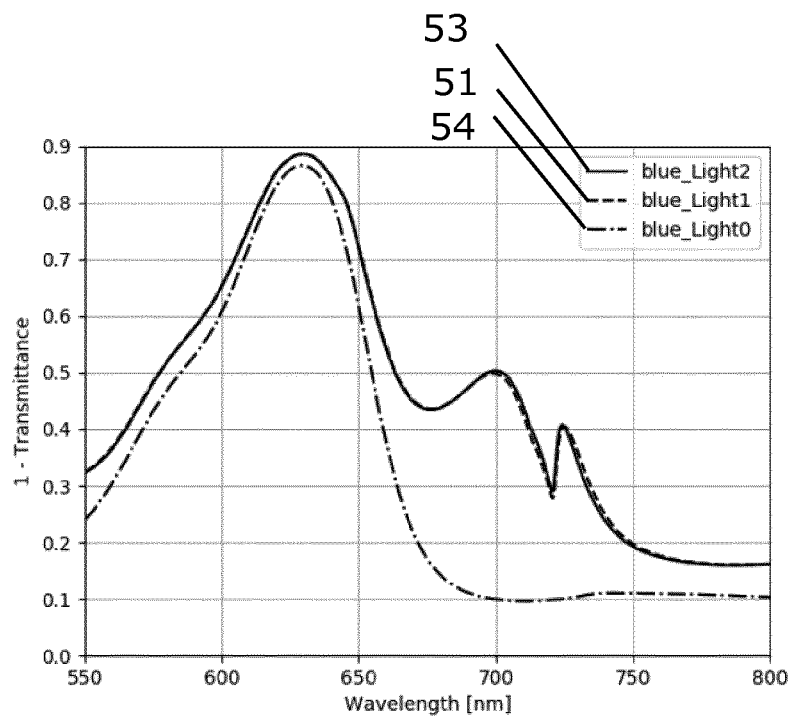

In FIG. 41, the attenuance spectra for incident wavelengths from 550 nm to 800 nm in units of 1-Transmittance are plotted for a Spectral Dataset recorded on a and brilliant blue solution. The "_Light0" spectrum with a maximum around 0.85 clearly indicates absorbance around 628 nm on a broad background of attenuation less than observed in FIG. 38 and FIG. 39. By comparing the spectral shapes of "_Light2" and "_Light1", small differences can be seen indicating scattering of the incident light but to a less extent than in FIG. 37-40. This indicates that brilliant blue colorant scatters light slightly.

Figure 42:
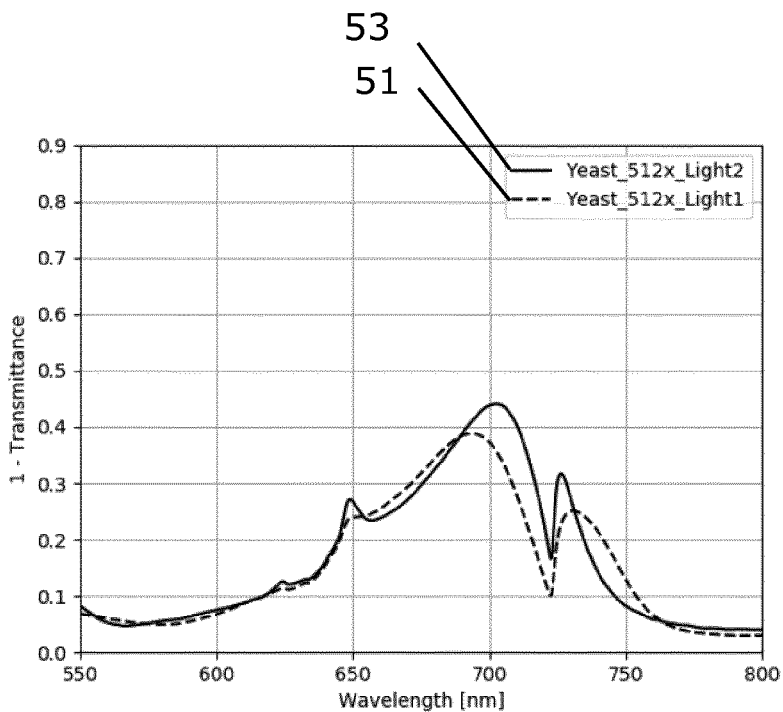

In FIG. 42, the attenuance spectra for "_Light2" and "_Light1" with "_Light0" subtracted with incident wavelengths from 550 nm to 800 nm in units of 1-Transmittance are plotted for a Spectral Dataset recorded on yeast cells suspended in water. By subtracting the "_Light0" spectrum and comparing the "_Light2" and "_Light1" spectrum, the sample scattering can be quantified.

Figure 43:
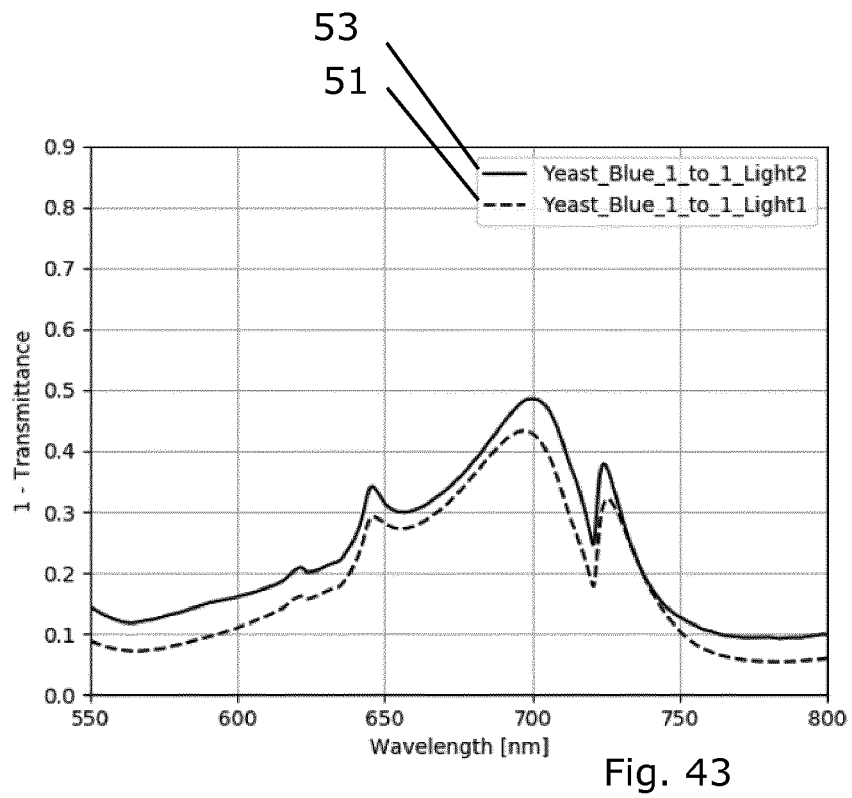

In FIG. 43, the attenuance spectra for "_Light2" and "_Light1" with "_Light0" subtracted with incident wavelengths from 550 nm to 800 nm in units of 1-Transmittance are plotted for a Spectral Dataset recorded on a 1:1 mixture of yeast cells suspended in water and brilliant blue solution. By subtracting the "_Light0" spectrum and comparing the "_Light2" and "_Light1" spectrum, the sample scattering can be quantified without being influenced by absorption from the brilliant blue colorant present in the sample.

Figure 44:
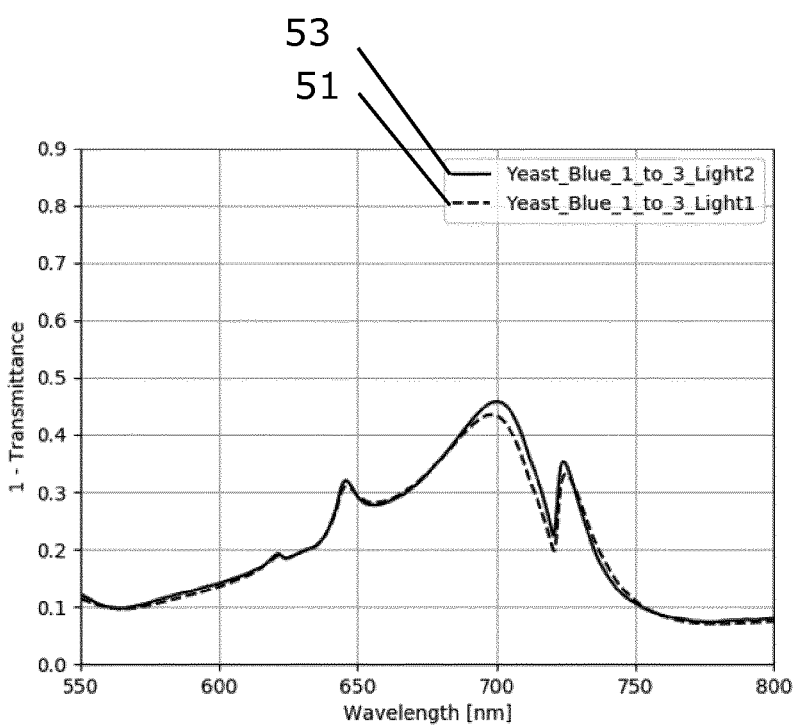

In FIG. 44, the attenuance spectra for "_Light2" and "_Light1" with "_Light0" subtracted with incident wavelengths from 550 nm to 800 nm in units of 1-Transmittance are plotted for a Spectral Dataset recorded on a 1:3 mixture of yeast cells suspended in water and brilliant blue solution. By comparing the "_Light2" and "_Light1" spectra after subtraction of the "_Light0" spectrum, the sample scattering can be quantified without being influenced by absorption from the brilliant blue colorant present in the sample.

Figure 45:
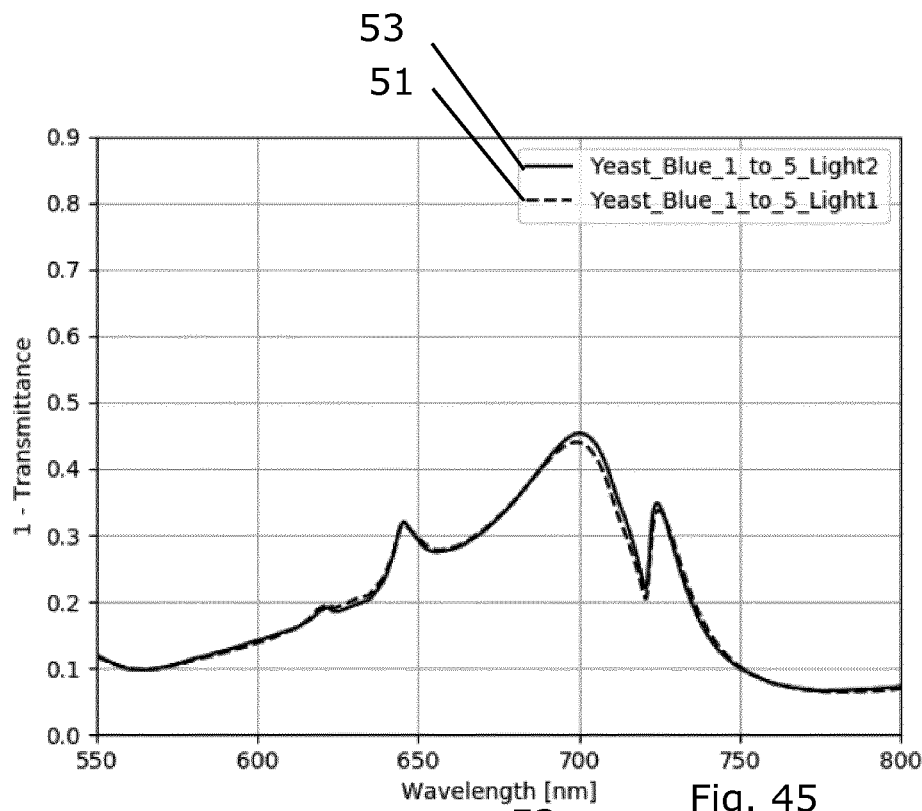

In FIG. 45, the attenuance spectra for "_Light2" and "_Light1" with "_Light0" subtracted with incident wavelengths from 550 nm to 800 nm in units of 1-Transmittance are plotted for a Spectral Dataset recorded on a 1:5 mixture of yeast cells suspended in water and brilliant blue solution. By comparing the "_Light2" and "_Light1" spectra after subtraction of the "_Light0" spectrum, the sample scattering can be quantified without being influenced by absorption from the brilliant blue colorant present in the sample.

Figure 46:
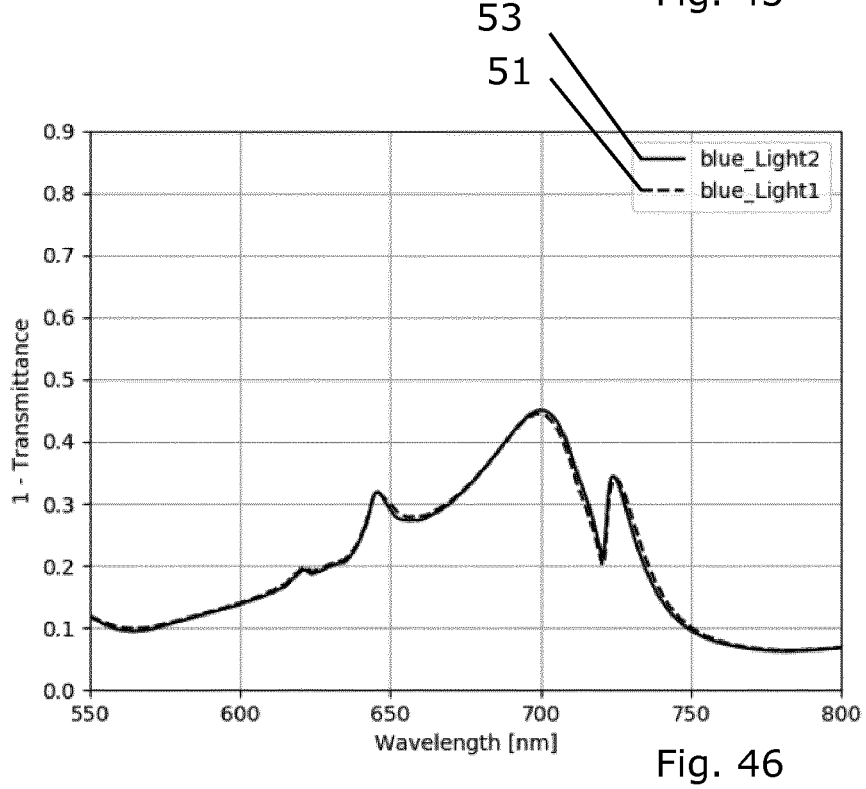

In FIG. 46, the attenuance spectra for "_Light2" and "_Light1" with "_Light0" subtracted with incident wavelengths from 550 nm to 800 nm in units of 1-Transmittance are plotted for a Spectral Dataset recorded on a brilliant blue solution. By comparing the "_Light2" and "_Light1" spectra after subtraction of the "_Light0" spectrum, the sample scattering can be quantified without being influenced by absorption from the brilliant blue colorant present in the sample. The spectral information on scattering is unaffected by the otherwise strong absorption from the brilliant blue colorant.

Thereby, FIGS. 37-46 demonstrate that by using the invention, e.g., in a cuvette format and, e.g., a conventional spectrophotometer, spectra information can be obtained that can distinguish between losses from scattering and losses from absorption. By adequate data processing, absorption and scattering optical models may be combined to yield both concentration and size determinations for a wide range of samples not possible to quantify in a spectrophotometer today.

The data in FIGS. 37-46 further demonstrate that the method can be used to distinguish different types of particles in solution, such as, e.g., different types of cells in solution.

The invention claimed is:

1. A method of liquid characterisation using an optical characterisation system, the optical characterisation system comprising:
    an optical element comprising a light source and light detector, and defining a light path extending between the light source and light detector, the detector being able to resolve light intensities at varying wavelengths;
    a liquid container comprising first and second container surfaces defining at least part of an interior of the liquid container, at least part of the first and second container surfaces being transparent and parallel; and
    a photonic crystal being attached to or being integrally formed with the first container surface and facing the interior, the photonic crystal comprising a first grating part having a first modulation period defined in a first plane,
    wherein the method comprises the steps of:
    recording a first transmission spectrum, wherein at least part of the first and second container surfaces, the interior containing liquid and the photonic crystal intercept the light path, and the interior intercepts the light path before the photonic crystal; and
    recording a second transmission spectrum, wherein at least part of the first and second container surfaces, the interior containing liquid and the photonic crystal intercept the light path, and the photonic crystal intercepts the light path before the interior,
    wherein the method comprises a step of deriving a quantitative measure of scattering from any particles in the liquid by analysing the first and second transmission spectra, and wherein the method comprises a step of deriving the average size of particles in the liquid comprising comparatively analysing the first and second transmission spectra, and/or wherein the method comprises a step of deriving the size distribution of particles in the liquid comprising comparatively analysing the first and second transmission spectra.

2. The method according to claim 1, wherein a second photonic crystal is attached to or integrally formed with the first container surface facing the interior, the second photonic crystal defining a second plane and comprising a second grating part having a second modulation period, and wherein the first and second transmission spectra are recorded with at least part of the second photonic crystal in the light path.

3. The method according to claim 2, wherein the first photonic crystal abuts the second photonic crystal.

4. The method according to claim 2, wherein the first modulation period gives rise to a first resonance wavelength band, and wherein the second modulation period gives rise to a second resonance wavelength band, and wherein the first and second resonance wavelength bands do not overlap.

5. The method according to claim 2, wherein both of the first and the second photonic crystals are in the light path simultaneously during recording of each of the first and second transmission spectra.

6. The method according to claim 1, wherein the optical element further comprises a container receptacle configured to hold the liquid container in at least a first and second orientation, and wherein the method comprises the steps of:

placing the liquid container in the container receptacle in the first orientation, the first orientation orienting the liquid container so as to record the first transmission spectrum; and changing the orientation of the liquid container in the sample holder to the second orientation, the second orientation orienting the liquid container so as to record the second transmission spectrum.

7. The method according to claim 1, wherein the optical element is configured to provide at least a first light path and a second light path, and wherein:

the first transmission spectrum is recorded with light being provided along the first light path, the interior and photonic crystal intercepting the first light path, and the interior intercepting the first light path before the photonic crystal;

the second transmission spectrum is recorded with light being provided along the second light path, the interior and photonic crystal intercepting the second light path, and the photonic crystal intercepting the second light path before the interior; and wherein the orientation of the liquid container is not altered between recording the first transmission spectrum and recording the second transmission spectrum.

8. The method according to claim 1, further comprising the step of:

recording a third transmission spectrum wherein the photonic crystal is not in the light path.

9. The method according to claim 8, wherein the liquid container further comprises third and fourth container surfaces defining at least part of the interior, at least part of the third and fourth container surfaces being transparent and parallel, and wherein the third transmission spectrum is recorded with at least part of the third and fourth container surfaces and the interior intercepting the light path.

10. The method according to claim 9, wherein the optical element is configured to provide at least a third light path, and wherein the third transmission spectrum is recorded with light being provided along the third light path, the third and fourth container surfaces intercepting the third light path.

* * * * *